(12) United States Patent
Glover et al.

(10) Patent No.: US 9,680,925 B2
(45) Date of Patent: Jun. 13, 2017

(54) METHODS AND APPARATUS TO ROUTE MESSAGE TRAFFIC USING TIERED AFFINITY-BASED MESSAGE ROUTING

(75) Inventors: Rene Glover, Pelham, AL (US); James Fox, Homewood, AL (US)

(73) Assignee: AT&T Intellectual Property I, L. P., Atlanta, GA (US)

(*) Notice: Subject to any disclaimer, the term of this patent is extended or adjusted under 35 U.S.C. 154(b) by 173 days.

(21) Appl. No.: 13/346,358

(22) Filed: Jan. 9, 2012

(65) Prior Publication Data
US 2013/0179536 A1   Jul. 11, 2013

(51) Int. Cl.
G06F 15/16 (2006.01)
H04L 29/08 (2006.01)
G06F 17/30 (2006.01)

(52) U.S. Cl.
CPC .... H04L 67/1025 (2013.01); G06F 17/30584 (2013.01); H04L 67/1014 (2013.01); H04L 67/1021 (2013.01); H04L 67/1029 (2013.01)

(58) Field of Classification Search
CPC . H04L 45/04; H04L 67/2814; H04L 67/1014; H04L 67/1025; H04L 67/1029; H04L 67/1021; G06F 15/16; G06F 17/30584
USPC .......................... 709/206, 207, 238, 244, 217
See application file for complete search history.

(56) References Cited

U.S. PATENT DOCUMENTS

| | | | |
|---|---|---|---|
| 5,341,477 A | 8/1994 | Pitkin et al. | |
| 5,751,963 A | 5/1998 | Umetsu | |
| 5,872,972 A | 2/1999 | Boland et al. | |
| 6,006,264 A | * 12/1999 | Colby | H04L 12/5695 709/220 |
| 6,157,955 A | 12/2000 | Narad et al. | |
| 6,167,445 A | 12/2000 | Gai et al. | |
| 6,170,009 B1 | 1/2001 | Mandal et al. | |
| 6,411,986 B1 | 6/2002 | Susai et al. | |
| 6,424,992 B2 | 7/2002 | Devarakonda et al. | |
| 6,587,466 B1 | 7/2003 | Bhattacharya et al. | |
| 6,678,835 B1 | 1/2004 | Shah et al. | |
| 6,735,701 B1 | 5/2004 | Jacobson | |
| 6,738,908 B1 | 5/2004 | Bonn et al. | |
| 6,775,280 B1 | 8/2004 | Ma et al. | |
| 6,820,121 B1 | 11/2004 | Callis et al. | |
| 6,847,609 B1 | 1/2005 | Sarnikowski et al. | |

(Continued)

OTHER PUBLICATIONS

Aaron et al, "Methods, Apparatus and Articles of Manufacture to Route Policy Requests," U.S. Appl. No. 12/915,672, filed Oct. 29, 2010, 30 pages.

(Continued)

Primary Examiner — Abdulkader M Alriyashi
(74) Attorney, Agent, or Firm — Hanley, Flight & Zimmerman, LLC

(57) ABSTRACT

Methods and apparatus to route network traffic using tiered affinity-based message routing are disclosed herein. An example method to select a destination endpoint for a message includes receiving a rule from a service provider, the rule specifying a set of destination endpoints associated with the service provider and the rule specifying a set of criteria to be used to select one of the destination endpoints for a message containing a data request. The method also includes sending the rule to a client service to be used to select the destination endpoint for the message based on a characteristic of the requested data.

15 Claims, 17 Drawing Sheets

(56) References Cited

U.S. PATENT DOCUMENTS

| | | |
|---|---|---|
| 6,944,183 B1 | 9/2005 | Iyer et al. |
| 6,954,780 B2 | 10/2005 | Susai et al. |
| 7,143,169 B1 | 11/2006 | Champagne et al. |
| 7,260,060 B1 | 8/2007 | Abaye et al. |
| 7,290,028 B2 | 10/2007 | Brabson et al. |
| 7,337,465 B2 | 2/2008 | Kiyoto et al. |
| 7,353,276 B2 | 4/2008 | Bain et al. |
| 7,380,002 B2 | 5/2008 | House et al. |
| 7,406,692 B2 | 7/2008 | Halpern et al. |
| 7,437,441 B1 | 10/2008 | Drew et al. |
| 7,552,235 B2 | 6/2009 | Chase et al. |
| 7,685,279 B2 | 3/2010 | Miltonberger et al. |
| 7,693,050 B2 | 4/2010 | Achlioptas et al. |
| 7,822,871 B2 | 10/2010 | Stolorz et al. |
| 8,042,148 B2 | 10/2011 | Andreasen et al. |
| 8,060,616 B1 * | 11/2011 | Richardson et al. ......... 709/226 |
| 8,584,226 B2 | 11/2013 | Kudla et al. |
| 8,645,517 B2 | 2/2014 | Stolorz et al. |
| 8,665,712 B2 | 3/2014 | Ramaswamy et al. |
| 2001/0052024 A1 | 12/2001 | Devarakonda et al. |
| 2002/0046284 A1 | 4/2002 | Brabson et al. |
| 2002/0059428 A1 | 5/2002 | Susai et al. |
| 2002/0065922 A1 | 5/2002 | Shastri |
| 2002/0087657 A1 | 7/2002 | Hunt |
| 2002/0138551 A1 | 9/2002 | Erickson |
| 2002/0147822 A1 | 10/2002 | Susai et al. |
| 2003/0065762 A1 | 4/2003 | Stolorz et al. |
| 2003/0229501 A1 | 12/2003 | Copeland et al. |
| 2004/0039803 A1 | 2/2004 | Law |
| 2004/0073596 A1 | 4/2004 | Kloninger et al. |
| 2004/0181689 A1 | 9/2004 | Kiyoto et al. |
| 2005/0240990 A1 | 10/2005 | Trutner et al. |
| 2005/0289618 A1 | 12/2005 | Hardin |
| 2006/0010252 A1 | 1/2006 | Miltonberger et al. |
| 2006/0167975 A1 | 7/2006 | Chan et al. |
| 2006/0294575 A1 | 12/2006 | Rogers |
| 2007/0226775 A1 | 9/2007 | Andreasen et al. |
| 2007/0245409 A1 | 10/2007 | Harris et al. |
| 2008/0025261 A1 | 1/2008 | Riley |
| 2008/0040306 A1 * | 2/2008 | Ma ..................................... 707/1 |
| 2008/0070594 A1 | 3/2008 | Barber |
| 2008/0147866 A1 | 6/2008 | Stolorz et al. |
| 2008/0215718 A1 * | 9/2008 | Stolorz et al. ................ 709/223 |
| 2008/0263180 A1 | 10/2008 | Hurst et al. |
| 2008/0276304 A1 | 11/2008 | Maffione et al. |
| 2009/0150565 A1 * | 6/2009 | Grossner ................ G06F 9/468 709/241 |
| 2009/0228431 A1 * | 9/2009 | Dunagan ............... H04L 67/327 |
| 2009/0259736 A1 * | 10/2009 | Chang et al. ................. 709/221 |
| 2009/0313372 A1 | 12/2009 | Streijl |
| 2010/0299451 A1 | 11/2010 | Yigang et al. |
| 2011/0058545 A1 | 3/2011 | Eriksson |
| 2011/0066718 A1 | 3/2011 | Susai et al. |
| 2011/0099265 A1 | 4/2011 | Antani et al. |
| 2011/0145386 A1 | 6/2011 | Stolorz et al. |
| 2011/0153770 A1 | 6/2011 | Antani et al. |
| 2011/0294518 A1 | 12/2011 | Siomina et al. |
| 2011/0314144 A1 | 12/2011 | Goodman |
| 2012/0084342 A1 | 4/2012 | Brown et al. |
| 2012/0102223 A1 * | 4/2012 | Zhang et al. ................. 709/239 |
| 2012/0110128 A1 | 5/2012 | Aaron et al. |
| 2012/0151056 A1 | 6/2012 | Sporel et al. |
| 2012/0254398 A1 * | 10/2012 | Thomas ........................ 709/224 |
| 2013/0036215 A1 | 2/2013 | Kupinsky et al. |
| 2013/0086278 A1 | 4/2013 | Schmidt |
| 2013/0298206 A1 | 11/2013 | Brown, III et al. |
| 2013/0311549 A1 | 11/2013 | Abdulkadev et al. |
| 2014/0029420 A1 | 1/2014 | Jeong et al. |

OTHER PUBLICATIONS

United States Patent and Trademark Office, "Non-Final Office Action," issued in connection with U.S. Appl. No. 12/915,672, mailed Mar. 29, 2013, 36 pages.

United States Patent and Trademark Office, "Final Office Action," issued in connection with U.S. Appl. No. 12/915,672, mailed Oct. 23, 2013, 38 pages.

United States Patent and Trademark Office, "Notice of Allowance and Fee(s) Due," issued in connection with U.S. Appl. No. 12/915,672, mailed Apr. 16, 2014, 28 pages.

* cited by examiner

Routing Path Table 310

| Routing Path Type | Routing Path Name | Definition |
|---|---|---|
| RouteGroup | RouteGroup1 | Route1 |
| RouteGroup | RouteGroup2 | Route2 |
| Route | Route1 | RouteOffer1 |
| Route | Route2 | RouteOffer2 |
| RouteOffer | RouteOffer1 | key value1 |
| RouteOffer | RouteOffer2 | key value2 |

Routing Selector Table 312

| Selector Type | Routing Path Name | Selector |
|---|---|---|
| RouteGroup | RouteGroup1 | Partner A |
| RouteGroup | RouteGroup2 | all Partners exc.PartnerA |
| Route | Route1 | no selector |
| Route | Route2 | no selector |

Key Value Table 314

| Key value | Associated Endpoint(s) | IP address for Endpoint |
|---|---|---|
| Key value1 | EndpointA | IP address for endpointA |
| Key value2 | EndpointB | IP address for endpointB |

RouteOffer Sequence Table 316

| RouteOffer Name | Sequence Value |
|---|---|
| RouteOffer1 | 1 |
| RouteOffer | 1 |

FIG. 3

METHODS AND APPARATUS TO ROUTE MESSAGE TRAFFIC USING TIERED AFFINITY-BASED MESSAGE ROUTING

FIELD OF THE DISCLOSURE

This disclosure relates generally to routing message traffic between computer applications and, more particularly, to using a tiered affinity-based approach to routing message traffic between applications.

BACKGROUND

When a user requests account or other business information on-line with a business application, that request for information is transmitted from the business application to a client service application associated with a client service provider (also referred to as a client service) and then to a service provider such as a business service that controls access to the requested information. The business service then provides the requested information to the client service application for usage by the business application. In existing message routing systems, a load balancer is responsible for routing all messages containing requests for information between the client service application and a set of business service endpoint(s) (also referred to as endpoint(s)) associated with the business service. In such message routing systems, a message from a client service application identifies the business service for which the message is intended and the load balancer identifies one of the business service endpoint(s) to which the message is to be routed based, at least in part, on load balancing.

In recent years, some such load balancers have also employed affinity based routing to perform message routing between message oriented services such as client service applications and business service endpoints that are deployed/distributed in an execution/runtime environment. Affinity based routing involves routing a message containing a data request based on a characteristic of the data being requested and is performed to reduce the number of network interactions needed to satisfy a single data request and thereby improve performance and customer experience. The data characteristics(s) used to route the message can be based on the location of the data being requested, the location of a partner with whom the data is associated, the location of the client service application, the manner in which a set of stored data is partitioned among business service endpoints and/or any number of other criteria.

When a business service deploys a new service endpoint, the business service notifies the load balancer operator which then reconfigures the load balancer to accommodate the new service endpoint. Reconfiguration of the load balancer may require hardware changes. Further, in some cases, the business service notifies each of the client applications of the existence of the new endpoint server and of the information contained in the endpoint server.

BRIEF DESCRIPTION OF THE DRAWINGS

FIG. 3 is a set of tables showing an example set of routing information that can be used by the affinity rules processor of FIG. 1 and/or FIG. 2 to select an appropriate endpoint.

Wherever possible, the same reference numbers will be used throughout the drawing(s) and accompanying written description to refer to the same or like parts.

DETAILED DESCRIPTION

Methods and apparatus to route network traffic using tiered affinity-based message routing are disclosed herein. Example methods to select a destination endpoint for a message include receiving a rule from a service provider, the rule specifying a set of destination endpoints associated with the service provider and the rule specifying a set of criteria to be used to select at least one of the destination endpoints for a message containing a data request. Some such example methods also include storing the rule and then sending the rule to a client service provider (also referred to as a client service) to be used to select the destination endpoint for the message based on a characteristic of the requested data. Some such example methods also include identifying a unique geographical location for each of the destination endpoints. Some such examples include receiving a physical location for each endpoint and incorporating the location of each endpoint into the rule.

Example methods disclosed herein can improve the speed and ease at which routing changes are implemented when a business service changes one or more of its set of associated service endpoints. In addition, example methods disclosed herein can be used to handle routing failover and load balancing. Further, example methods disclosed herein can be used to more efficiently route messages by using a tiered approach by which a first tier is based on a partner associated with data being requested, a second tier is based on a characteristic of a data partitioning strategy, and a third tier is based on the geographic location of the data being requested.

Figure 1:
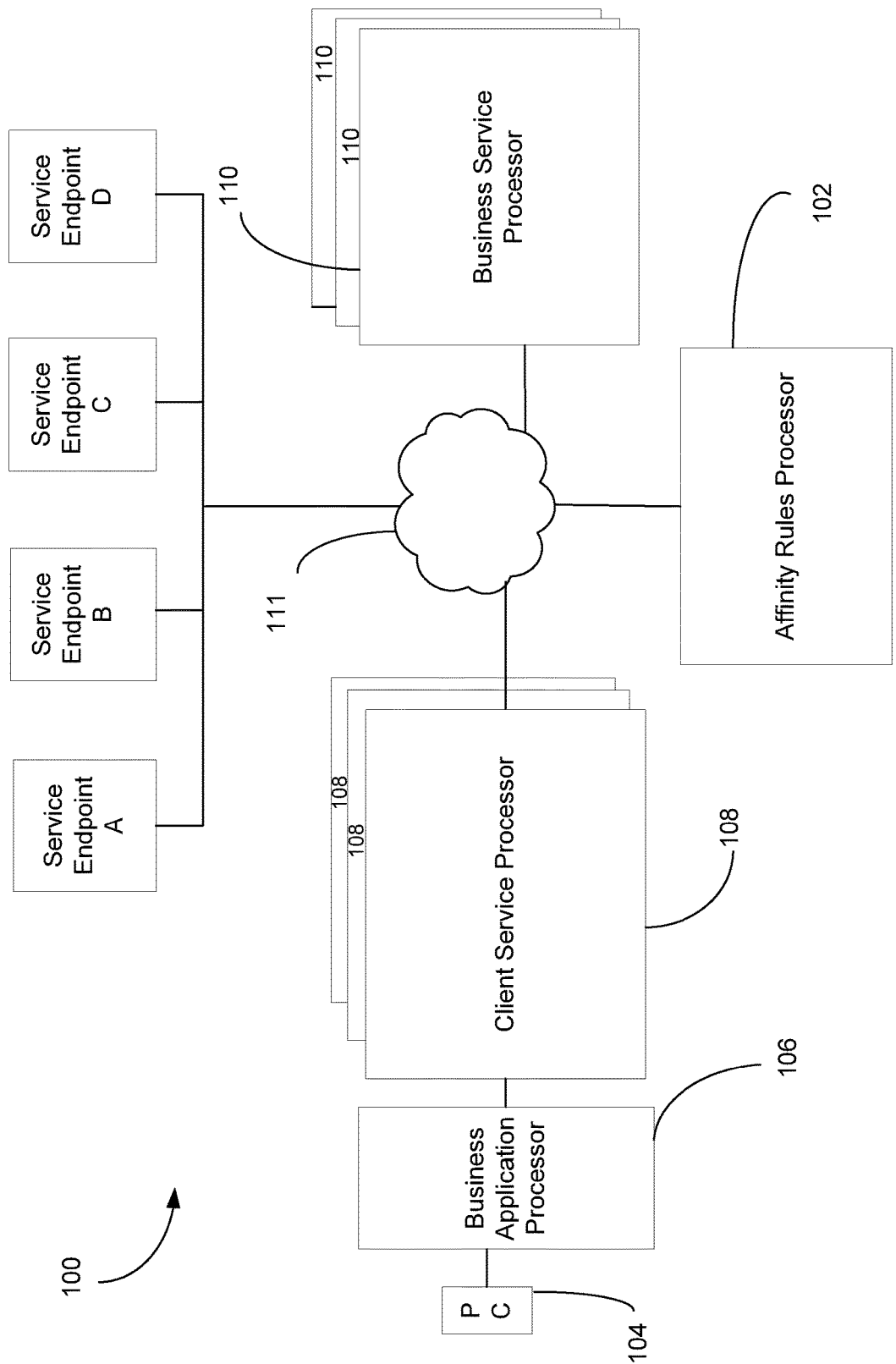
FIG. 1 is block diagram of an example message routing system having an example affinity rules processor that stores an affinity rule used to select an endpoint associated with a business service for delivery of a message.

An example message routing system 100 having an example affinity rules processor 102 constructed in accordance with the teachings of this disclosure is illustrated in FIG. 1. The example system 100 includes a user interface via, for example, a personal computer 104 by which a user requests business information. In the illustrated example, the request for business information is received at an example business application processor 106 which transmits the information request to an example client service processor 108. Although, for illustrative purposes, FIG. 1 shows the example client service processor 108 as an entity that is separate from the example business service application, in some example message routing systems, the client service processor 108 and the elements disposed therein are implemented by, or as a part of, the business service application processor 106. The client service processor 108 of the illustrated example determines the underlying data needed to respond to the information request and determines which of several service providers, such as business service providers, controls the underlying data. In the example of FIG. 1, a business service processor 110 associated with the identified business service provider (also referred to as a business service) creates an affinity rule that identifies how the underlying data is partitioned among one more of a set of service endpoints A, B, C and D. In some examples, the service endpoints can be implemented as servers that access data stored at the service endpoints A, B, C, D. The business service processor 110 of the illustrated example can partition the data in any of a variety of ways. For example, the business service processor 110 can partition the data among the endpoints A, B, C and D based on a geographic location of the service endpoints A, B, C, D relative to one or more client service processors 108 or relative to one or more data partners (not shown). Additionally or alternatively, the business service processor 110 of the illustrated example can partition the data based on one or more contextual characteristics of the data. One such contextual characteristic includes a numeric range associated with the data, (e.g., all data associated with a first numeric range can be stored at a service endpoint A and all data associated with a second numeric range can be stored at a service endpoint B). In some examples, the data is additionally or alternatively partitioned based on a partner or entity associated with the data. For example, all information associated with a first partner can be stored in the service endpoint A and all information associated with any other partner can be stored in the service endpoints B, C and D. As used herein, a partner is a subscriber of the business service and provides data to be stored and provided by the business service to one or more of the client services. In yet another example, for redundancy, a data set stored at the service endpoint A can also be stored at the service endpoint B. The service endpoints A, B, C, and D can be located at the same geographic location or at different geographic locations. The business service processor 110 makes the affinity rules available to the client service processor(s) 108 via the affinity rules processor 102. In some examples, the business service processor 110 publishes the affinity rules to the affinity rules processor 102. The client service processor 108 then retrieves the affinity rules from the affinity rules processor 102. In some examples, the affinity rules processor 102 sends the affinity rules to the client service processor 108 in response to a request for the rules from the client service processor 108.

The client service processor 108 of the illustrated example prepares a request message containing a request for at least some of the underlying data needed to respond to the request for information. The request message is delivered via a network 111 to one or more of the service endpoints A, B, C, D based on the affinity rules(s) created by the business service processor 110. To select the service endpoint to which the request message is to be directed, the client service processor 108 applies the affinity rule created by the business service processor 110 to descriptive information (also referred to as "descriptive data") associated with the request message. Application of the affinity rule to the request message enables selection of the endpoint based on the data partitioning strategy deployed by the business service processor 110.

The selected service endpoint(s) A, B, C, and/or D sends a responsive message containing the requested underlying data to the client service processor 108 that sent the request. The client service processor 108 collects and compiles the underlying data for usage by the business application processor 106 and delivery to the user interface 104.

Figure 2:
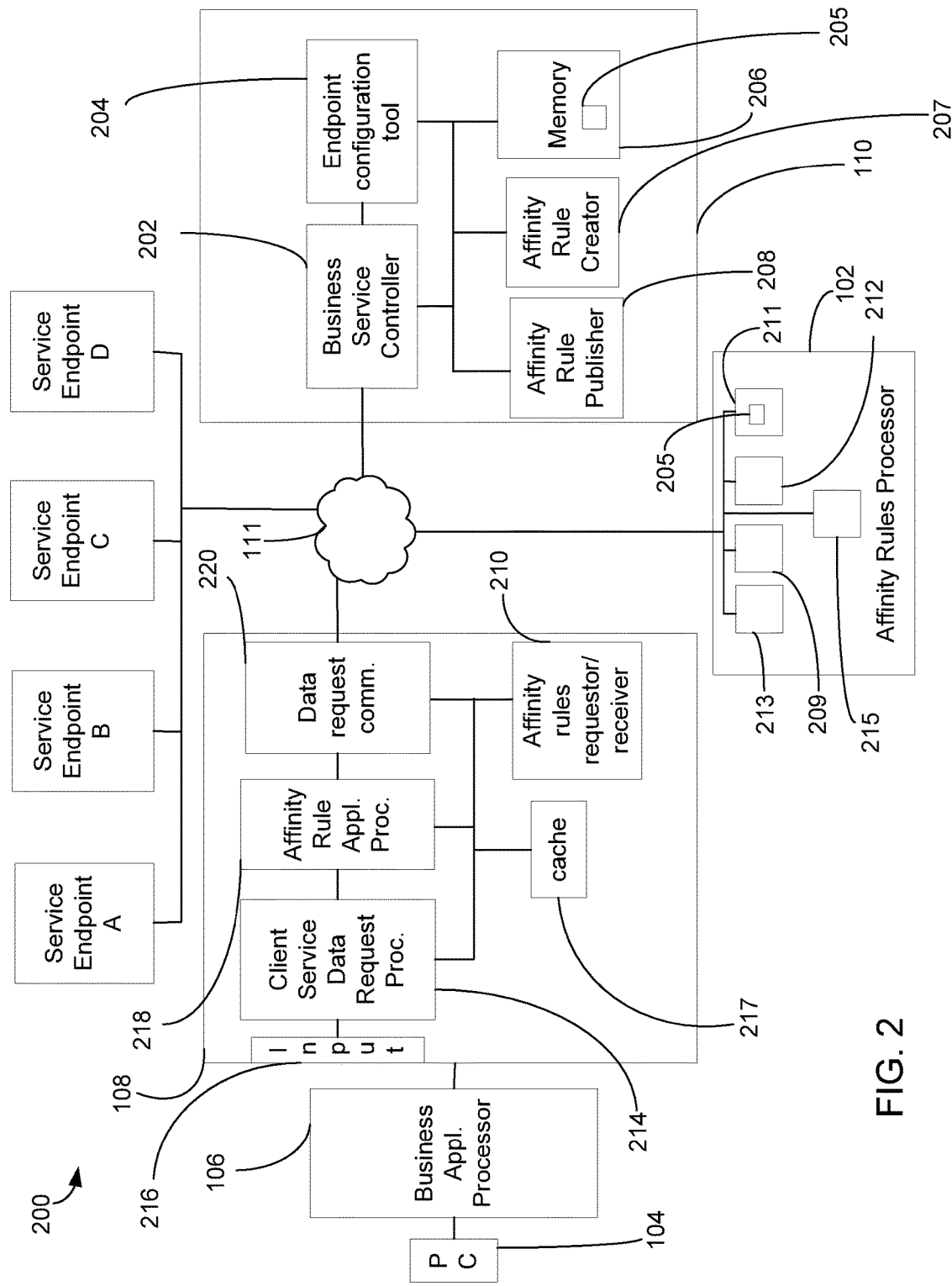
FIG. 2 is a block diagram of an example implementation of the example message routing system of FIG. 1.

A block diagram of example implementations of the example message routing system 100 of FIG. 1 is illustrated in FIG. 2. In this example, the business service processor 110 controls how business service data is partitioned among the set of service endpoints A, B, C, and D. The business service processor 110 of the illustrated example includes a business service controller 202 that controls a service endpoint configuration tool 204 to provide a data partitioning strategy among the service endpoints A, B, C and D. An example affinity rule creator 207 of the example business service processor 110 uses information about the data partitioning strategy to create an affinity rule 205 which is stored, at least temporarily in a memory 206. In some examples, the affinity rule 205 is stored in a light weight data access protocol tree. An example affinity rules publisher 208 publishes the affinity rule 205 to a communication tool 209 associated with the affinity rule processor 102. The affinity rules processor 102 stores the affinity rule 205 received from the affinity rules publisher 208 in a memory 211 for retrieval by an affinity rule requestor/receiver 210 of the client service processor 108. In some examples, an affinity rule creator 212 is disposed in the affinity rule processor 102 instead of or in addition to the affinity rule creator 207 disposed in the business service processor 110. The affinity rule creator 212 has the same general function as the affinity rule creator 207. In some examples, an affinity rule storage/retrieval tool 215 stores the affinity rule 205 along with information identifying the business service provider that published the affinity rule 205 in the memory 211. As a result, the memory 211 contains a set of affinity rules each associated with a business service provider that published the affinity rule 205. The affinity rule requestor/receiver 210 of the illustrated example requests that the affinity rule 205 be provided or otherwise made available for retrieval when underlying data associated with the business service provider is requested. In response, the affinity rule storage/retrieval tool 215 extracts the appropriate affinity rule 205 from the memory 211 and provides the affinity rule to the communication tool 209 for transmission to the affinity rule requestor/receiver 210 of the client service processor 108. In some examples, the communication tool 209 makes the affinity rule 205 available for retrieval by the affinity rule requestor/receiver 210. In some examples, the communication 209 tool is implemented using a first communication tool to receive the affinity rule 205 and a second communication tool to make the affinity rule available to the client service processor 108.

In the illustrated example, the affinity rule 205 is stored in a memory 217 of the client service processor 108 for use in selecting among the endpoints A, B, C, or D. In some examples, the affinity rule 205 is stored in a light weight data access protocol tree. The client service processor 108 periodically and/or aperiodically updates the affinity rule 205 stored in the memory 217 to ensure that the latest affinity rule associated with the business service processor 110 is used for endpoint selection. In some examples, the communication tool 209 transmits the affinity rule 205 to the affinity rule requestor/receiver 210 upon receipt of a request for the affinity rule 205 from the affinity rule requestor/receiver 210.

In the illustrated example, an example data request processor 214 receives a request for information from the business application processor 106 at an input 216. In this example the data request processor 214 prepares a request message for the underlying data needed to fulfill the request for information. In the illustrated example, the request message includes descriptive data identifying one or more characteristics of the data that is evaluated using the affinity rule 205 to select an endpoint to which the request message is to be delivered. The descriptive data can include information that identifies any of 1) a business service that controls the data being requested, 2) a version of the business service, 3) a data partner associated with the data being requested, 4) contextual information about the data being requested, 5) identifying information about where the client service processor 108 is geographically located and/or 6) an environment in which the client service processor 108 is calling for the requested data (e.g., a production environment, a non-production environment, etc.).

The data request processor 214 of the illustrated example communicates the request message corresponding to the underlying data to an example affinity rule application processor 218. The example affinity rule application processor 218 of the client service processor 108 applies the affinity rule 205 to the request message to select the service endpoint to which the request message is to be directed. In some examples, the affinity rule application processor 218 applies the affinity rule 205 to the request message by comparing one or more of the characteristics associated with the data being requested with a set of criteria associated with how the data is partitioned among the set of endpoints. As described above, the data can be partitioned in any number of ways including based on a data partner associated with the data, a contextual characteristic of the data and/or a geographical location of the service endpoint that houses the data or the geographical location of the client service requesting the data, etc.

In the illustrated example, each affinity rule is associated with a specific business service and is applied to request messages for data controlled by the specific business service. In the illustrated example, a request message communicator 220 of the client service processor 108 transmits the request message to a network 111 for delivery to the selected service endpoint A, B, C, or D. In some examples, information identifying the selected service endpoint is embedded by the rules application processor 218 or the request message communicator 220 into the request message as, for example, routing metadata, for use by the network 111 in routing the request message to the selected service endpoint.

In some examples, the affinity rule 205 identifies one or more paths that terminate at one or more of the service endpoints, and further identifies one or more criteria, or selectors, used to select among the paths. Because, in such examples, each path terminates in an endpoint, selection of a path results in selection of a service endpoint. The paths identified by the affinity rule 205 of the illustrated example includes an example RouteGroup component that is selected based on a partner criteria, an example Route component that is selected based on a contextual data characteristic criteria, and an example RouteOffer component that is selected based on a geographical location criteria. The criteria used to select among path components reflect the manner in which the business service data is partitioned among the service endpoints A, B, C and D. In some examples, the term "path" is intended to reflect a decision path by which an endpoint is selected and is not intended to reflect a physical path by which a request message is routed in the network 111.

In the illustrated example, the RouteOffer component is associated with, or linked to, one or more of the service endpoints A, B, C, D having a physical location (e.g., which may be represented by a unique set of latitudinal and longitudinal coordinates). Because each service endpoint has a corresponding physical location, the RouteOffer component associated with any given path determines a set of geographical locations to which a request message can be directed. In some examples, each RouteOffer component is assigned a corresponding single key value representing one or more endpoints associated with the RouteOffer component. When a service endpoint becomes operational, the endpoint configuration tool 204 assigns the service endpoint a key value (e.g., the service endpoint dynamically registers with a RouteOffer at startup).

In the illustrated example, the Route component is associated with one or more RouteOffer components and is used to select an endpoint based on how the data is partitioned among the service endpoints A, B, C, D using one or more contextual characteristics of the data. For example, a Route component used to select an endpoint based on data that is partitioned into a set of data ranges will be associated with RouteOffer components that are linked to a set of service endpoint(s) each containing data within at least one of the data ranges. In this example, a Route component used to select an endpoint for data associated with a first data range will identify a RouteOffer component(s) that is linked to service endpoints that contain data in the first data range.

In the illustrated example, the RouteGroup component is associated with one or more Route components and is used to select an endpoint based on a partner of the data being requested. In some examples, a first RouteGroup component is used to select an endpoint based on data associated with a first partner and a second RouteGroup component is used to select an endpoint based on data associated with a second partner.

In the illustrated example, a set of criteria, or selectors, used to select a path for any given request message includes a RouteGroup selector, a Route selector and a RouteOffer selector. The RouteGroup selector of the illustrated example identifies specific partner(s) associated with each Route-Group component. The RouteGroup component associated with any given partner is selected for all request messages associated with that given partner. For example, a first RouteGroup component can be assigned a partnerA selector and a second RouteGroup component can be assigned a partnerB selector. In this example, the first RouteGroup component will be selected for request messages associated with the partner A. Likewise, the second RouteGroup component will be selected for request messages associated with the partner B.

The Route selector of the illustrated example identifies how the data is partitioned among the endpoints based on a contextual characteristic of the data. The Route component associated with any given contextual characteristic is selected for all request messages associated with that contextual characteristic. For example, a first Route component can be assigned a first data range selector and a second Route component can be assigned a second data range selector. In such examples, the first Route component will be selected for request messages associated with data in the first data range and the second Route component will be selected for request messages associated with data in the second data range. In the illustrated example, pinned route selector identifies a fixed key value and is supplied by the client service with the request message. Each fixed key value is associated with a Route component such that a client can use the fixed key value to select the Route component to be used for any given request message. When a fixed key value is included in a request message of the illustrated example, the affinity rule 205 is not applied to the request message, as an endpoint has been identified by the fixed key value. The affinity rule application processor 218 of the illustrated example can use the fixed key value (e.g., a pinned route) to override application of an affinity rule.

Each RouteOffer component of the illustrated example is associated with a set of endpoints such that selecting the RouteOffer component results in identifying a select set of endpoints. The order in which delivery of a request message is attempted at any given RouteOffer component depends on the RouteOffer sequence. In the illustrated example, the RouteOffer Sequence identifies an order in which multiple RouteOffer components associated with a specific Route component are selected. For example, a RouteOffer sequence can specify that a request message routed through a specific Route component is to be delivered to an endpoint associated with a first RouteOffer component, and, in the event that the delivery attempt to the endpoint(s) associated with the first RouteOffer component fails, an endpoint associated with a second RouteOffer component is selected and delivery is again attempted or vice versa. The RouteOffer Sequence, of some examples, is implemented by assigning each RouteOffer component associated with a given Route component a sequence number that denotes the priority in which an endpoint associated with a RouteOffer component will be selected. In such examples, endpoints associated with a RouteOffer component having a higher sequence value will be selected before endpoints associated with RouteOffer components having a lower sequence number will be selected. In other examples, service endpoints associated with RouteOffer components having a lower sequence number will be selected before service endpoints associated with RouteOffer components having a higher sequence number. Endpoints associated with RouteOffer components having the same sequence number are treated equally. This sequencing of RouteOffer components allows the messaging system to account for failover. In some examples, delivery will be attempted to each of the service endpoints associated with one RouteOffer component, in turn, before delivery will be attempted to service endpoints associated with any other RouteOffer component. To effect delivery of a single request message to a second endpoint in the event that delivery to a first endpoint fails, the rules application processor 218 of the illustrated example embeds the information identifying the second endpoint in the request message before attempting to resend the request message via the network 111. In other examples, the data request communicator embeds the information identifying the second endpoint in the request message before attempting to resend the request message via the network 111

Figure 4:
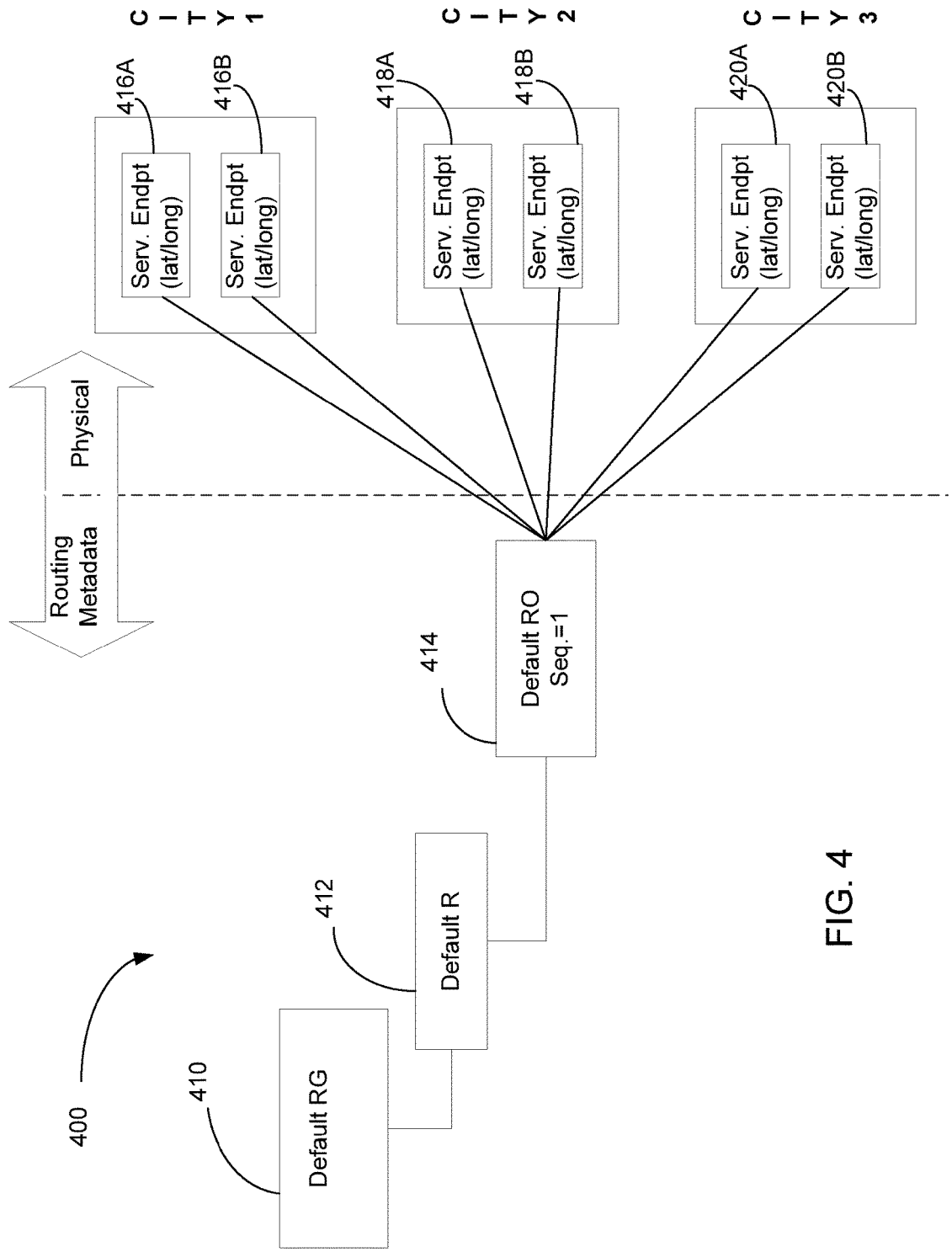
FIG. 4 is a diagram of an example affinity rule that can be used to select a default endpoint.

Referring now to the example of FIG. 4, the paths associated with an affinity rule are represented by an example Routing Path Table 310 that identifies how the path components are linked to form a set of paths. The set of criteria, or selectors, used to select a path are represented in an example Routing Selector Table 312 that identifies a set of selector types, a set of selectors and a set of path components associated with each of the selectors. In the illustrated example, a Key Value Table 314 identifies the service endpoints associated with each key value and identifies an IP address for each service endpoint. In the example of FIG. 3, RouteOffer Sequence Table 316 identifies a sequence number for each RouteOffer component. In some examples, all or some of the information contained in the tables 310, 312, 314, and/or 316 is generated by the endpoint configuration tool 204. In some examples, all or some of the information contained in the tables 310, 312, 314, and/or 316 is generated by the affinity rule creator 207.

The affinity rule creator 207 of the illustrated example develops an affinity rule, which may be implemented using, for example, HTML, based on the information contained in the tables 310, 312, 314, 316 of FIG. 3 stored in the memory 206. Specifically, the routing path table 310 is used to create a set of paths, each beginning at a separate one of the RouteGroup components. In the illustrated example each path starting at a RouteGroup component branches to each of its associated Route components. In the example of FIG. 3, each path associated with a given Route component branches to each of its associated RouteOffer components and each path associated with a RouteOffer component is associated with a set of key values. The Selector Table 312 of the illustrated example is used to associate each RouteGroup and Route component with a corresponding selector that is applied to the descriptive data contained in each request message to select an appropriate one of the path components. The sequence value assigned to each RouteOffer component in the RouteOffer Sequence Table 316 is used to define an order in which request messages will be delivered to RouteOffer components associated with the same Route component. The Key Value Table 314 of the illustrated example is used to identify the endpoints associated with each RouteOffer.

The affinity rule application processor 218 applies the affinity rule 205 stored in the memory 217 to a request message by determining whether more than one Route Group is identified in the Routing Path Data Table 310. If more than one RouteGroup is identified, the descriptive data associated with the request message is evaluated against the selector associated with each of the Route Groups. The Route Group having a selector that is satisfied by the partner data associated with the request message is selected. Next, the affinity rule application processor 218 determines if more than one Route is identified in the Routing Path Data Table as being associated with the selected Route Group. If more than one Route is identified for the selected Route Group, the descriptive data associated with the request message is evaluated against the selector associated with each of the Routes. The Route having a selector that is satisfied by the data associated with the request message is selected. In some examples, the affinity rule 205 is applied by the affinity rule application processor 218 as a decision tree in which a set of decisions are made to select among the path components based on the descriptive data associated with the request message. If only one path component is available at any point in the affinity rule, then that path component is selected by default.

The affinity rules application processor 218 of the illustrated example then determines whether more than one RouteOffer is identified by the affinity rule 205 as being associated with the selected Route. If more than one RouteOffer is identified for the selected Route, a sequence associated with each RouteOffer is used to determine the order in which message delivery will be attempted among the RouteOffers. In some examples, if all of the RouteOffers have the same sequence value, message delivery will first be attempted to the nearest geographical endpoint and will failover to other Route all routes globally in any desired order. As described above, if a single RouteGroup, Route or RouteOffer is associated with any particular path, then the single RouteGroup, Route or RouteOffer is selected by default.

In some examples, for all RouteOffers having the same sequence value, the request messages can be delivered to the endpoints associated with the RouteOffers in a serialized sequence. For example, if three RouteOffers are associated with a given path, a first request message can be delivered to an endpoint associated with the first RouteOffer, a second request message can be delivered to an endpoint associated with the second RouteOffer and a third request message can be delivered to an endpoint associated with the third RouteOffer. Alternating message delivery between the endpoints associated with different RouteOffers allows for load balancing among the RouteOffers by limiting the number of request messages to be processed by a set of endpoints at any given time. In other examples, load balancing can be achieved by alternating message delivery among the endpoints associated with a single RouteOffer.

To handle failover, in the event that an attempt to deliver a request message to a selected endpoint associated with a first RouteOffer fails because, for example, the endpoint is offline, another endpoint associated with the same RouteOffer is selected and delivery is again attempted and so on until the request message is successfully delivered. If all attempts to deliver the request message to the endpoints associated with a RouteOffer fail, an endpoint associated with another RouteOffer is selected and delivery is again attempted. In some examples, the system does not attempt to deliver a request message to a service endpoint that is offline until a threshold (e.g., predetermined) amount of time has elapsed. By waiting until a threshold amount of time has elapsed, delivery of a given request message to an offline endpoint will not be repeatedly attempted until the endpoint has been given time to come back online. In this way, the data traffic occurring on the network is reduced to effect load balancing. In some examples, if an attempt to deliver a request message to a selected endpoint fails, the affinity rules application processor 218 selects another endpoint and delivery to each of the other endpoints associated with the same RouteOffer is attempted, in turn, before delivery to the endpoints associated with another RouteOffer will be attempted.

Referring still to the illustrated example of FIG. 3, the example Routing Path Table 310 indicates that a first RouteGroup component, RouteGroup1, is associated with a first Route component, Route1, and a second RouteGroup component, RouteGroup2, is associated with a second Route component, Route2. Additionally, the Route1 is associated with a first RouteOffer, RouteOffer1, and the Route2 is associated with a second RouteOffer, RouteOffer2. The RouteOffer1 is associated with a first key value, key value1, and the RouteOffer2 is associated with a second key value, key value2.

The example Routing Selector Table 312 indicates that RouteGroup1 is to be selected for all request messages associated with a partner, Partner A, and RouteGroup2 is to be selected for all request messages associated with all partners excluding Partner A. In this example, there is no selector information for either of Route1 or Route2 such that neither Route1 nor Route2 is selected based on how the data is partitioned among the endpoints associated with these Route components.

The example Key Value Table 314 of the illustrated example indicates that the key value 1 is associated with the service endpoint A having an IP address A and that the key value 2 is associated with the service endpoint C having an IP address C. The RouteOffer Sequence Table 316 indicates that RouteOffer1 and RouteOffer2 have the same sequence number.

Using the example Tables 310, 312, 314 and 316 of the illustrated example of FIG. 3, the RouteGroup1 will be selected for all request messages for data associated with the partner, (e.g., partner A). The Route1 is selected for all request messages associated with the RouteGroup1. The RouteOffer1 is selected for all request messages associated with the Route1. And the RouteOffer1 corresponds to the EndpointA. As a result, in the illustrated example the EndpointA having the IP address A is selected for all request messages associated with partner A using the path defined by RouteGroup1, Route1 and RouteOffer1. A single RouteOffer component, RouteOffer1, is associated with this path such that the sequence value that is used to sequence message delivery to endpoints associated with multiple RouteOffer components is not used.

Referring still to the example tables of FIG. 3, the RouteGroup2 will be selected for all request messages for data associated with all partners excluding the partner A. The Route2 is selected for all request messages associated with the RouteGroup2. The RouteOffer2 is selected for all request messages associated with Route2. And the RouteOffer2 corresponds to the EndpointB. As a result, the EndpointB having an IP address B is selected for all request messages associated with all partners excluding partner A using the path defined by RouteGroup2, Route2 and RouteOffer2.

In some examples, the information in the Tables 310, 312, 314, 316 is modified to effect endpoint selection based on any combination of the specified criteria. Moreover, the Tables 310, 312, 314, 316 can be modified at any time to reflect changes to the data stored in the various service endpoints A, B, C, and D associated with the business service. When the business service changes the data stored in any given endpoint and/or changes the criteria by which endpoints will be selected for the request messages, the business service revises the Tables of FIG. 3 and, thus, the example affinity rule 205 accordingly. The example business service processor 110 transmits the revised affinity rule to the example affinity rules processor 102 for use by the client service processor 108 to select service endpoints based on the revised configuration. In some examples, the Key Value table 314 is stored at the affinity rules processor 102 and a location tool 213 uses the Key Value table 314 to identify endpoints/physical addresses for Key Values associated with an affinity rule. In this way, changes to the configuration of the data stored in the endpoints A, B, C and D can be reflected by changing the endpoints associated with any affected key values. In such an illustrated example, the Key Value Table 314 is transmitted by the affinity rule publisher 208 to the communication tool 209 of the affinity rules processor 102.

Referring now to FIG. 4, in some examples the Tables 310, 312, 314, 316 are not configured such that an associated affinity rule 400 indicates that a default routing path is used to select an endpoint. In some examples, request messages are routed via a path formed by a default RouteGroup 410, a default Route 412 and a default RouteOffer 414. The default RouteOffer 414 corresponds to a set of service endpoints, two being located in a city1 416A, 416B, two being located in a city2 418A, 418B, and two being located in a city3 420A, 420B. Thus, request messages are directed to the nearest endpoints first, within distance bands, and failover globally across all other available physical locations. Distance bands represent predefined radius around corresponding sets of endpoints such that a first endpoint located within the predefined radius of a second endpoint will be treated as though they are geographically co-located.

Figure 5:
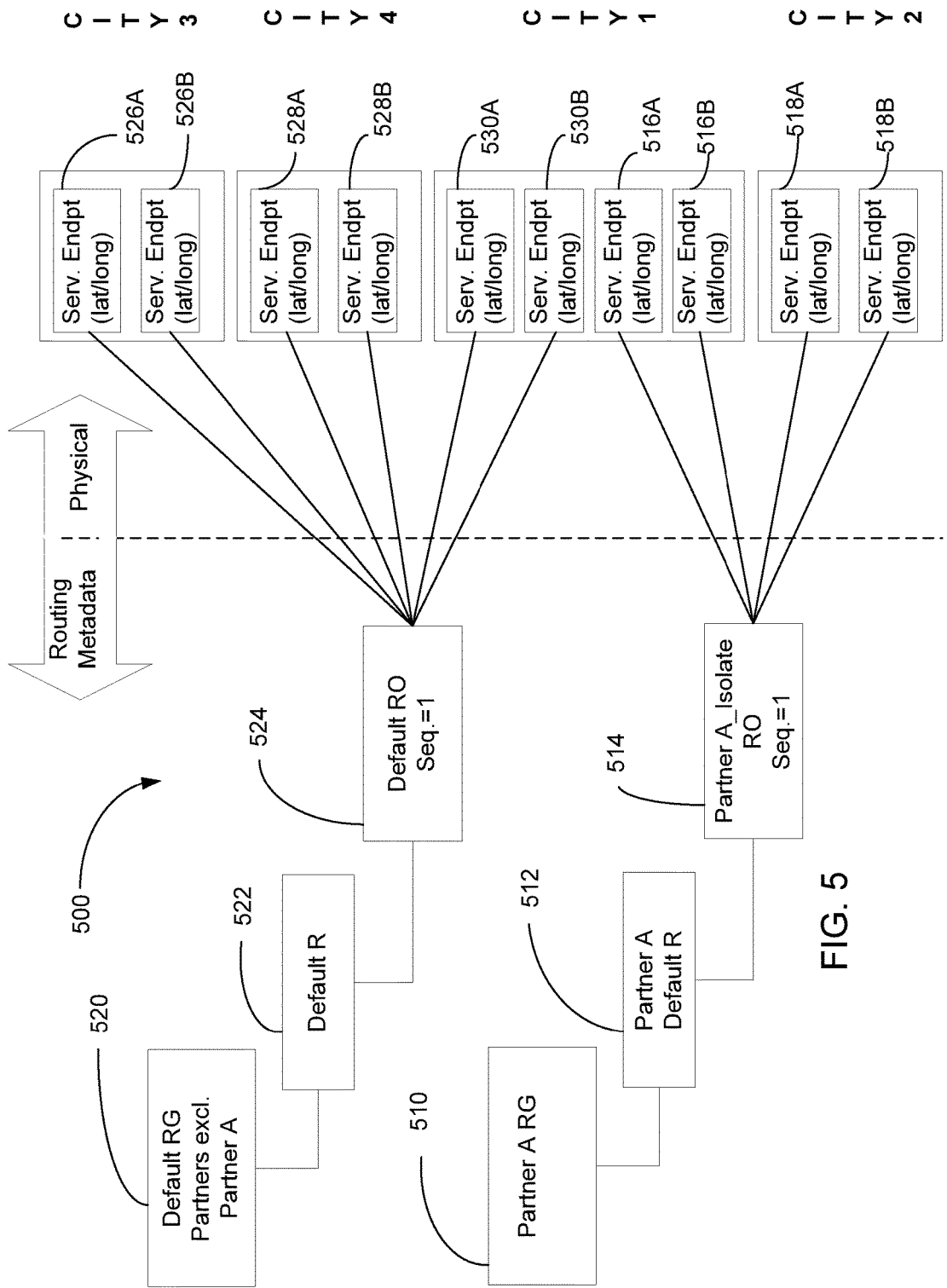
FIG. 5 is a diagram of an example affinity rule that can be used to achieve partner data isolation.

Referring to the illustrated example of FIG. 5, an example affinity rule 500 is configured to provide partner isolation wherein all request messages for a first partner, (e.g., Partner A), are routed to a first set of endpoints, and all request messages for partners excluding the Partner A are routed to a second set of endpoints. A Partner A RouteGroup 510, a Partner A_Default Route 512 and a Partner A_Isolate RouteOffer 514 are selected for all request messages associated with the Partner A. The Partner A_Isolate RouteOffer 514 corresponds to a set of service endpoints in a city1 516A, 516B, and in a city2 518A, 518B. A default RouteGroup 520, a default Route 522 and a default RouteOffer 524 are selected for all request messages associated with all partners excluding the Partner A. The default RouteOffer 524 corresponds to a set of service endpoints in the city3 526A, 526B and in a city4 528A, 528B and in the city1 530A, 530B. Using this configuration, the data associated with the Partner A can be isolated from the data associated with other partners.

Figure 6:
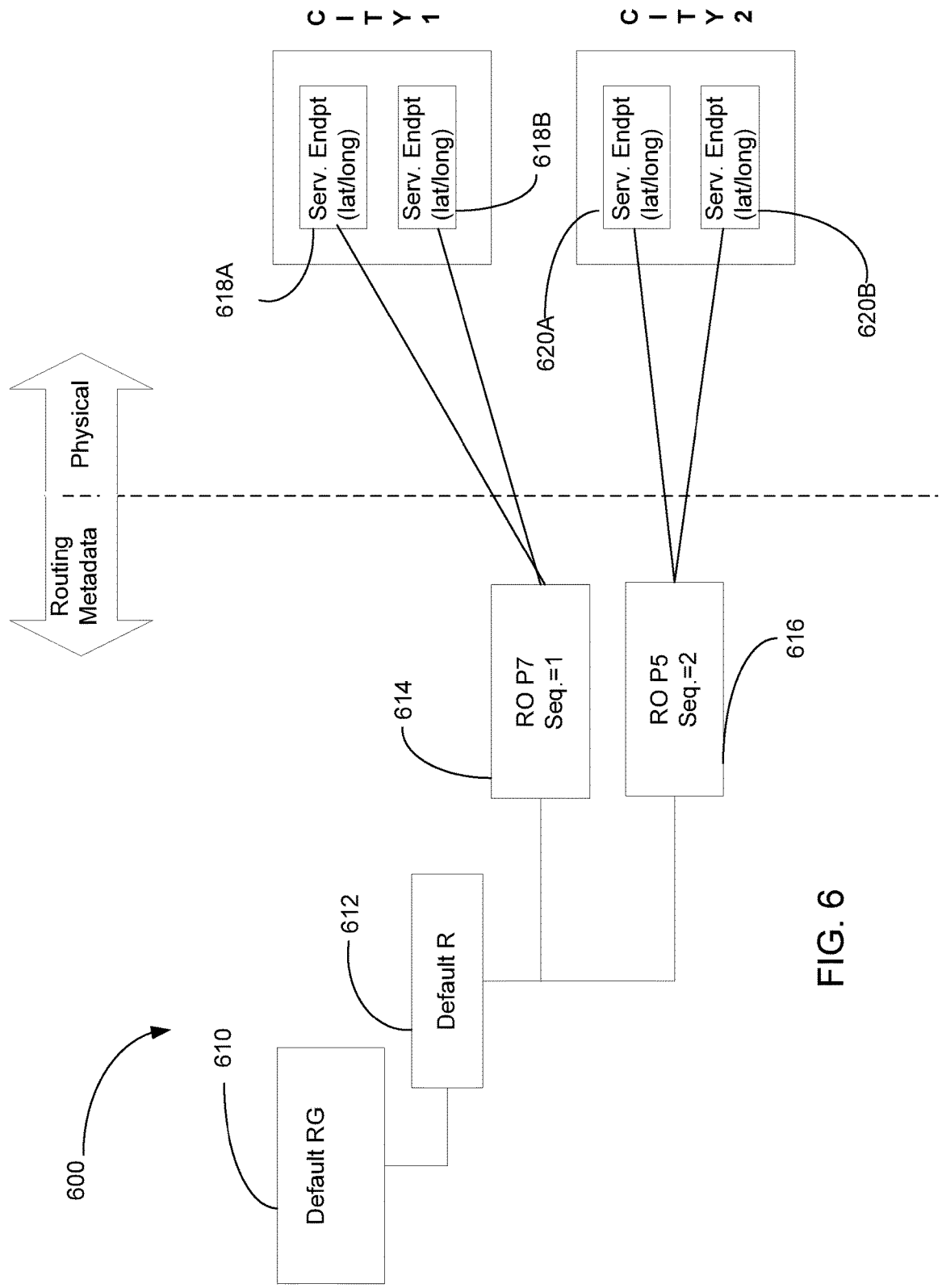
FIG. 6 is a diagram of an example affinity rule that can be used to achieve multi-offer failover.

Referring to the illustrated example of FIG. 6, an example affinity rule 600 is configured to provide multi-offer failover wherein multiple endpoints are selected for a given request message so that if an attempt to deliver the request message to a first selected endpoint fails, another endpoint is selected and delivery is again attempted. Using this example affinity rule, can reduce network traffic by limiting the number of times that a single request message is transmitted to the same non-responsive endpoint. In the illustrated example, a default RouteGroup 610, a default Route 612 and a RouteOffer P7 614 and a RouteOffer P5 616 are selected for request messages. In this configuration, the Route Offer P7 614 is associated with endpoints in a city1 618A, 618B and has a sequence value of 1 and the Route offer P5 616 is associated with endpoints in a city2 620A, 620B and has a sequence value of 2. Because the RouteOffer P7 614 has a lower sequence value than RouteOffer P5 616, request messages will first be delivered to one of the endpoints in city1 618A, 618B and, in the event that delivery to endpoint(s) in the city1 618A, 618B fails, the request(s) will be delivered to endpoint(s) in city2 620A, 620B. Delivery to each endpoint 618A, 618B associated with RouteOffer P7 614 will be attempted before delivery to any of the endpoints 620A, 620B associated with RouteOffer P5 616 will be attempted.

Figure 7:
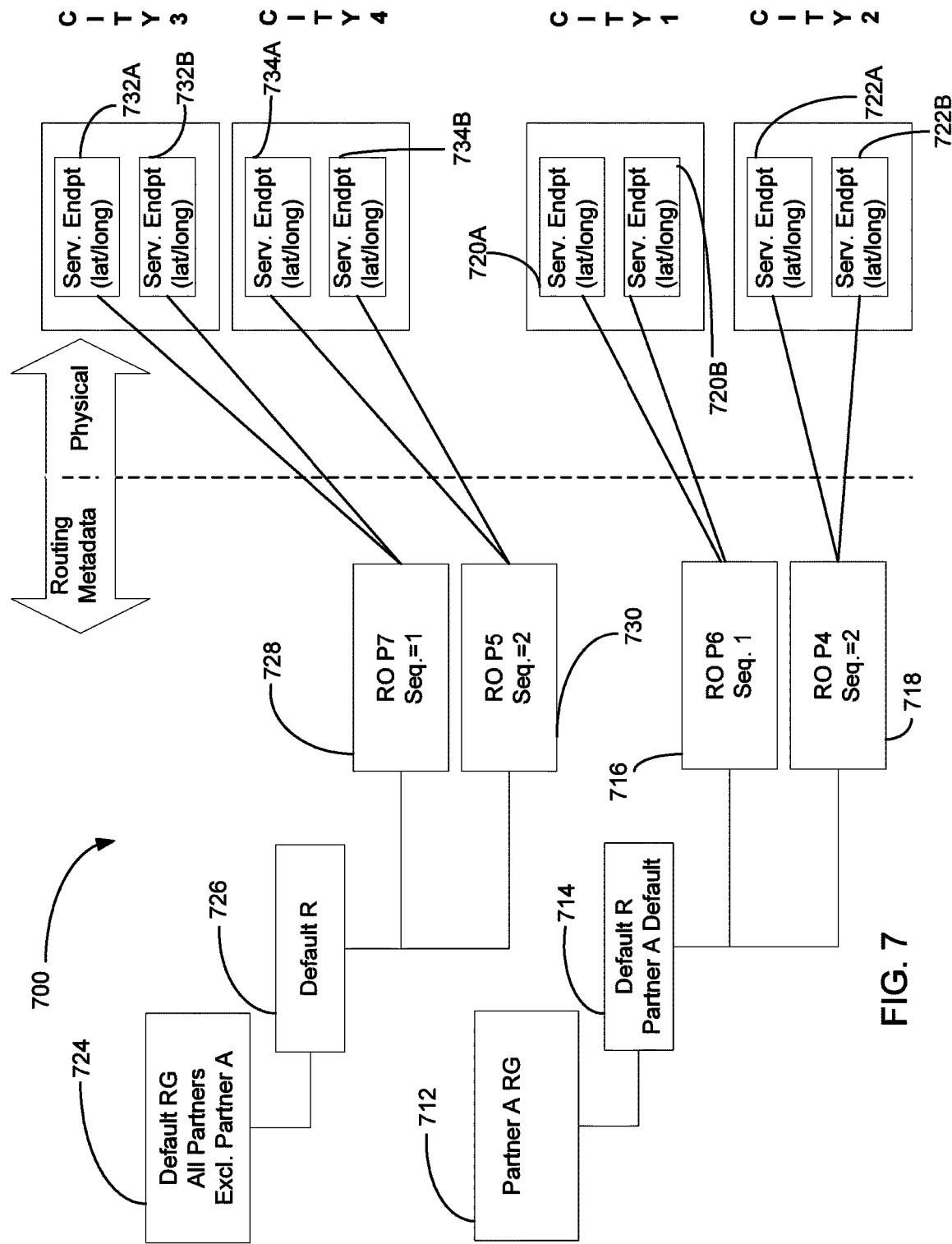
FIG. 7 is a diagram of an example affinity rule that can be used to achieve multi-offer failover with partner data isolation.

Referring to the illustrated example FIG. 7, an example affinity rule 700 is configured to provide multi-offer failover with partner isolation. A PartnerA RouteGroup 712, a Partner A_Default Route 714, a RouteOffer P6 716 and a RouteOffer P4 718 are selected for the request messages associated with a partner, Partner A. In this configuration, the Route Offer P6 716 is associated with endpoints in a city1 720A, 720B and has a sequence value of 1 and the Route offer P4 718 is associated with endpoints in a city2 732A, 732B and has a sequence value of 2. Because the RouteOffer P6 716 has a lower sequence value than Route Offer P4 718, request messages will be delivered to one of the endpoints in the city1 720A, 720B and, in the event that delivery to endpoint(s) in the city1 720A, 720B fails, the corresponding request message(s) will be delivered to at least one of the endpoints in the city2 722A, 722B. In the illustrated example of FIG. 7, delivery to the endpoint(s) 720A, 720B associated with RouteOffer P6 716 will be attempted before delivery to any of the endpoints 722A, 722B associated with RouteOffer P4 718 will be attempted. A default RouteGroup 724, a default Route 726, a RouteOffer P7 728 and a RouteOffer P5 730 are selected for all request messages associated with partners excluding Partner A. In this configuration, the RouteOffer P7 728 is associated with endpoints in a city3 732A, 732B and has a sequence value of 1 and the Route offer P5 is associated with endpoints in a city4 734A, 734B and has a sequence value of 2. Because the RouteOffer P7 728 has a lower sequence value than Route Offer P5 730, all request messages will first be delivered to one of the endpoints in city3 732A, 732B and, in the event that all deliveries to the endpoints in city3 732A, 732B fail, the request message will be delivered to at least one of the endpoints in a city4 734A, 734B. In this example, delivery to each endpoint associated with RouteOfferP7 728 will be attempted before delivery to any of the endpoints associated with RouteOffer P5 730 will be attempted.

Figure 8:
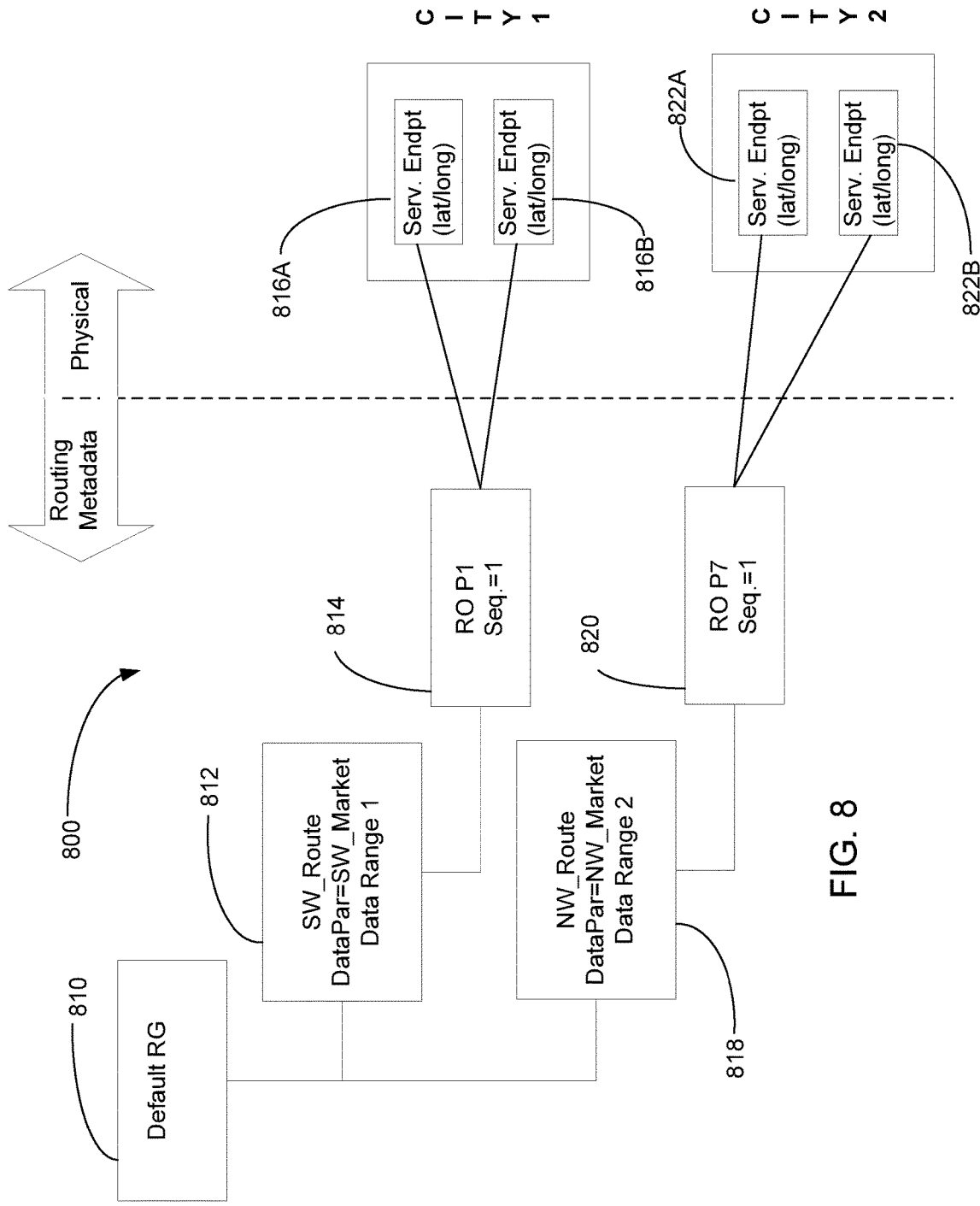
FIG. 8 is a diagram of an example affinity rule that can be used to achieve data affinity.

Referring to the illustrated example of FIG. 8, an example affinity rule 800 is configured to provide selection of an endpoint based on a contextual characteristic of the data. Such contextual characteristics can include zip code, state, city, telephone number, area code, customer account code, product code product type, product classification, region. In the illustrated example, partner isolation is not provided such that a Default RouteGroup 810 is selected for all request messages. A SW_Route 812 and a RouteOffer P1 814 having a sequence value of 1 are selected for all request messages associated with a first data partition called SW_Market. The RouteOffer P1 814 is associated with endpoints in a city1 816A, 816B so all request messages associated with the SW_Route 812 are delivered to an endpoint in the city1 816A, 816B. A NW_Route 818 and a RouteOffer P7 820 having a sequence value of 1 are selected for all request messages associated with a second data partition called NW_Market. The RouteOffer P7 820 is associated with endpoints in a city2 822A, 822B so all request message associated with the NW_Route are delivered to an endpoint in the city2 822A, 822B. In this example, the SW_Market data is associated with a data range, Data Range 1, and the NW_Market data is associated with a data range, Data Range 2.

Figure 9:
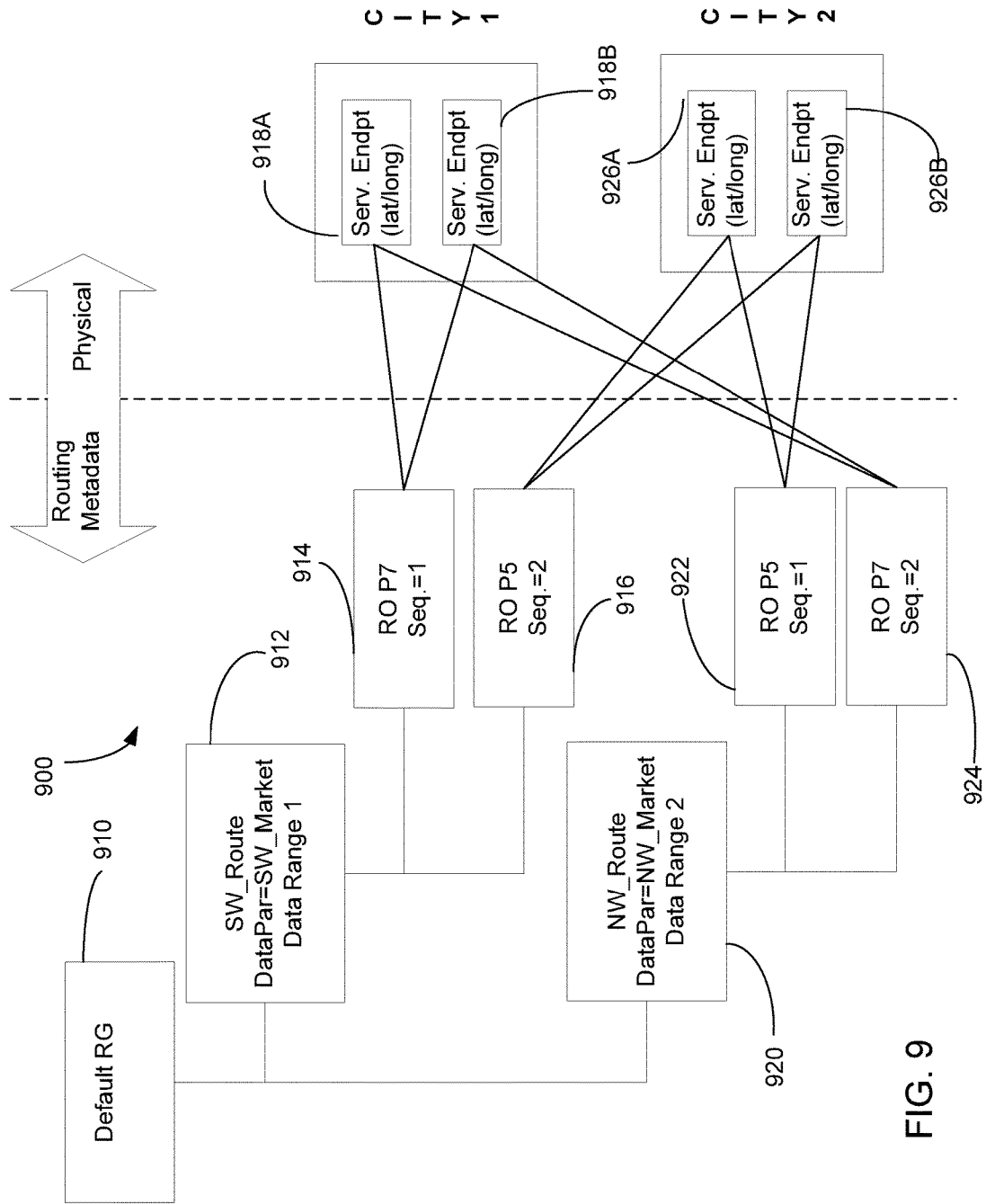
FIG. 9 is a diagram of an example affinity rule that can be used to achieve data affinity with multi-offer failover.

Referring to the illustrated example of FIG. 9, an example affinity rule 900 is configured to provide selection of an endpoint based on a contextual characteristic of the data and provides for multi-offer failover. In the illustrated example, partner isolation is not provided such that a Default RouteGroup 910 is selected for all request messages. A SW_Route 912 is selected, a RouteOffer P7 914 and a RouteOffer P5 916 are selected for all request messages associated with a first data partition called SW_Route. The RouteOffer P7 914 is associated with endpoints in a city1 918A, 918B and has a sequence value of 1 and the RouteOffer P5 916 is associated with endpoints in a city2 926A, 926B and has a sequence value of 2. So all request messages associated with SW_Route are delivered to one or more of the endpoints in the city1 918A, 918B, and, in the event that all delivery attempts to the endpoints in the city1 918A, 918B fail, delivery is attempted to the endpoints in the city2 926A, 926B. A NW_Route 920, a RouteOffer P5 922 and a RouteOffer P7 924 are selected for all request messages associated with second data partition called NW_Market. The RouteOffer P7 924 is associated with endpoints in the city1 918A, 918B and has a sequence value of 2 and the RouteOffer P5 922 is associated with endpoints in the city2 926A, 926B and has a sequence value of 1. So all request messages associated with the NW_Route are delivered to one of the endpoints in the city2 926A, 926B and, in the event that all delivery attempts to the endpoints in the city2 922A, 922B fail, delivery is attempted to the endpoints in the city1 918A, 918B. In the illustrated example, the SW_Market data is associated with a data range, Data Range 1, and the NW_Market data is associated with a data range, Data Range 2. In this example, Route Offer P7 associated with city1 is preferred for SW Market data because it has a lower sequence value than Route Offer P5 associated with city2. Only in the event of failover of RouteOffer P7 will the SW market data be transmitted to the endpoints in city2. Similarly, Route Offer P5 associated with city2 is preferred for NW Market data because it has a lower sequence value than Route Offer P7 associated with city1. Only in the event of failover of RouteOffer P5 will the NW Market data be transmitted to the endpoints in city1.

Figure 10:
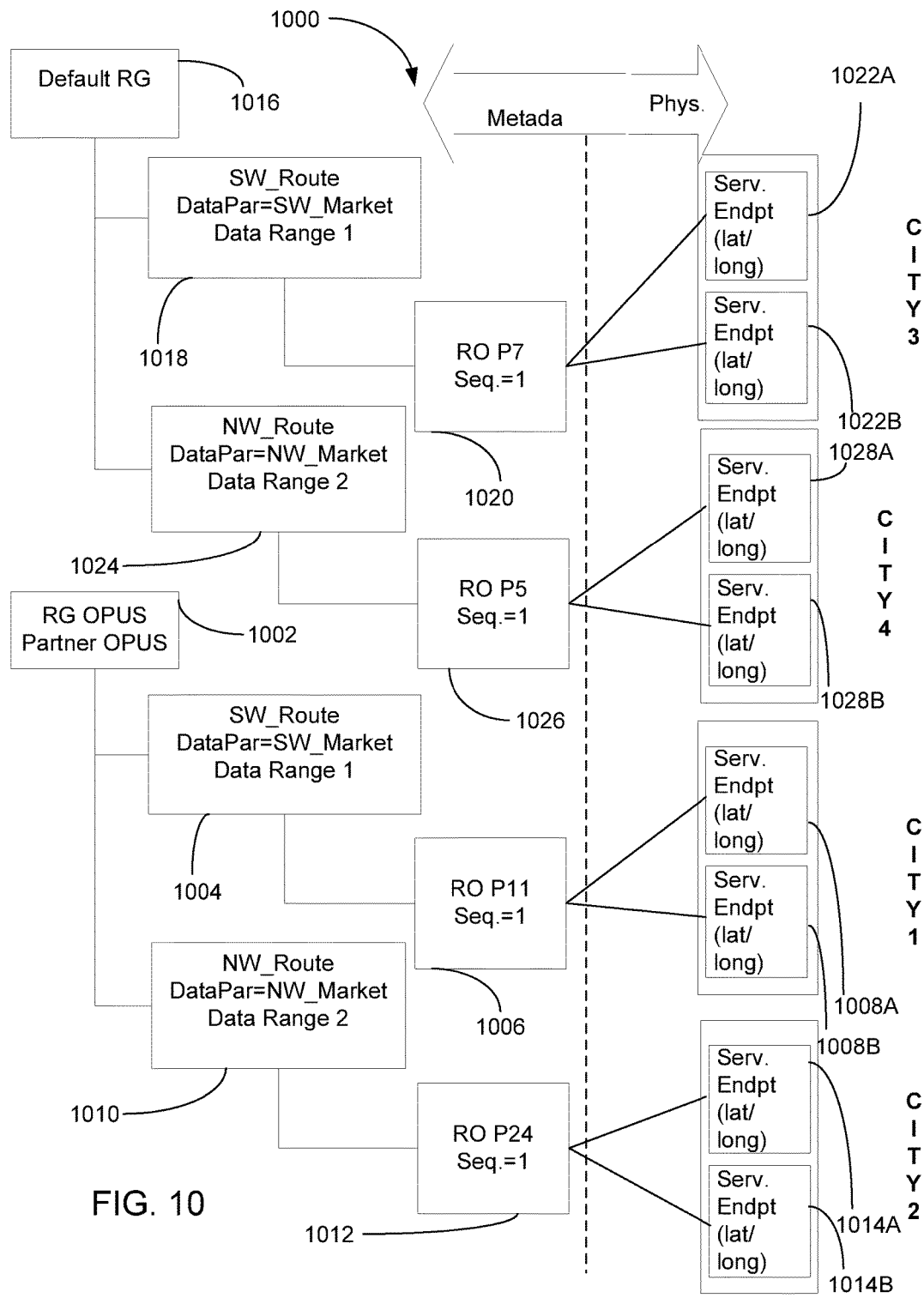
FIG. 10 is a diagram of an example affinity rule that can be used to achieve data affinity with partner data isolation.

Referring to the illustrated example of FIG. 10, an example affinity rule 1000 is configured to provide selection of an endpoint based on a contextual characteristic of the data and to provide for partner isolation. In the illustrated example, a Partner A RouteGroup 1002 is selected for all request messages associated with a partner, Partner A. If the Partner A isolated data is associated with a SW Market data partition, a SW Route 1004 and a RouteOffer P11 1006 are selected. As shown in FIG. 10, the RouteOffer P11 1006 is associated with endpoints in a city1 1008A, 1008B. As a result, all Partner A request messages associated with the SW market are delivered to an endpoint in the city1 1008A, 1008B. If the Partner A isolated data is associated with a NW market, a NW Route 1010 and a RouteOffer P24 1012 are selected. The RouteOffer P24 1012 is associated with endpoints in a city2 1014A, 1014B. As a result, all Partner A request messages associated with the NW market are delivered to an endpoint in the city2 1014A, 1014B. In this example, the SW_Market data is associated with a data range, Data Range 1, and the NW_Market data is associated with a data range, Data Range 2.

In the illustrated example, a Default RouteGroup 1016 is selected for all request messages associated with any partner excluding the Partner A. If the non Partner A data is associated with a SW Market data partition, a SW Route 1018 and a RouteOffer P7 1020 are selected. As shown in FIG. 10, the RouteOffer P7 1020 is associated with an endpoint in a city3 1022A, 1022B. As a result, all non Partner A request messages associated with the SW market are delivered to an endpoint in city3 1022A, 1022B. If the non Partner A isolated data is associated with a NW market, a NW Route 1024 and a RouteOffer P5 1026 are selected. The RouteOffer P5 1026 is associated with endpoints in a city4 1028A, 1028B. As a result, all non Partner A request messages associated with the NW market are delivered to an endpoint in the city4 1028A, 1028B.

Figure 11:
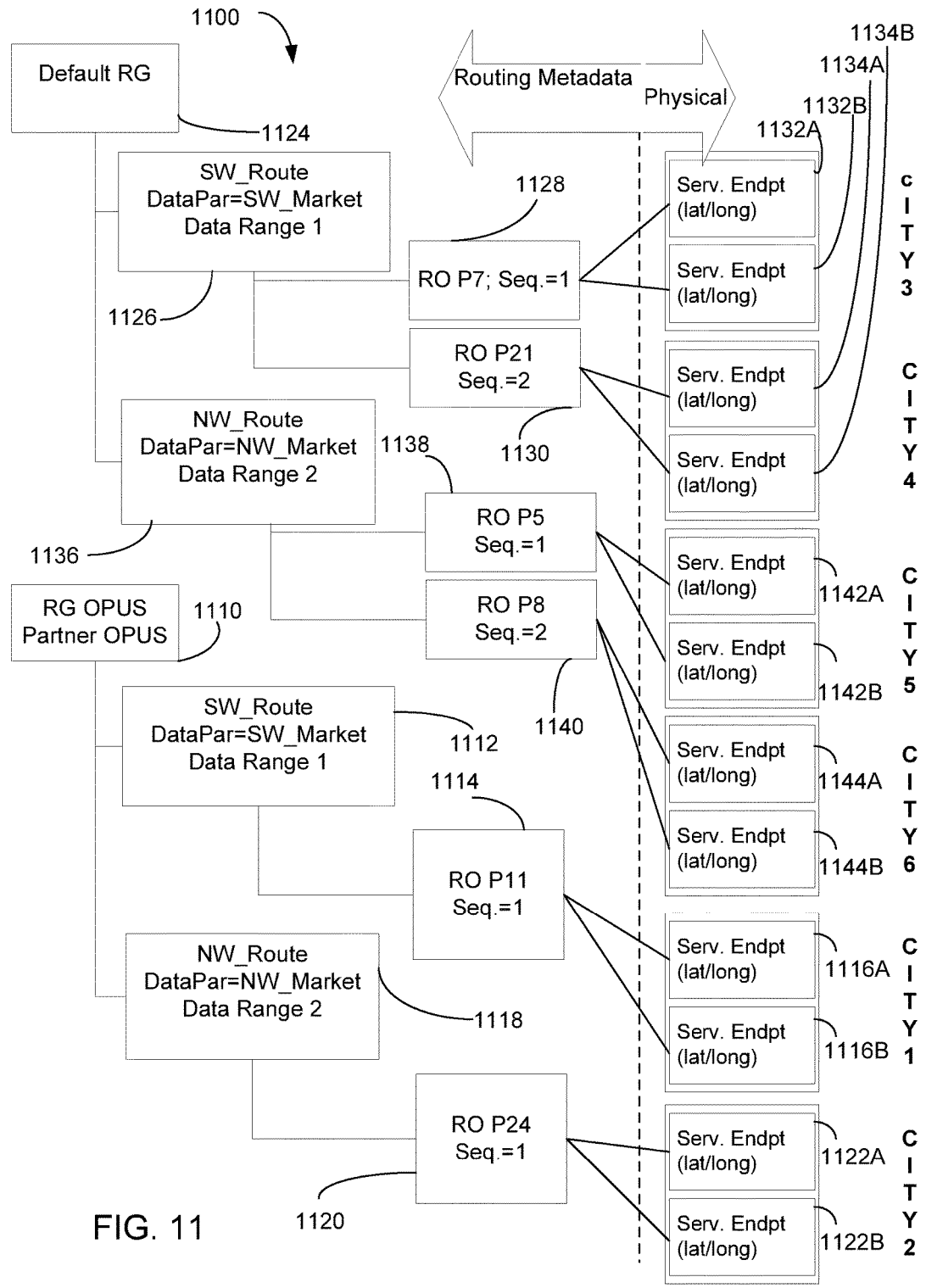
FIG. 11 is a diagram of an example affinity rule that can be used to achieve data affinity with multi-offer failover and partner data isolation.

Referring to FIG. 11, in some examples, an affinity rule 1100 is configured to provide selection of an endpoint based on a contextual characteristic of the data and to provide for partner isolation and multi-offer failover. In the illustrated example, a Partner A RouteGroup 1110 is selected for all requests associated with a partner, Partner A. If the Partner A isolated data is associated with a SW Market data partition, a SW Route 1112, and a RouteOffer P11 1114 are selected. As shown in FIG. 11, the RouteOffer P11 1114 is associated with endpoints in a city1 1116A, 1116B. As a result, all Partner A request messages associated with the SW market are delivered to an endpoint in city1 1116A, 1116B. If the Partner A isolated data is associated with a NW market, a NW Route 1118 and a RouteOffer P24 1120 are selected. The RouteOffer P24 1120 is associated with endpoints in a city2 1122A, 1122B. As a result, all Partner A request messages associated with the NW market are delivered to an endpoint in city2 1122A, 1122B. In the illustrated example implementation, the SW_Market data is associated with a data range, Data Range 1 and the NW_Market data is associated with a data range, Data Range 2.

In the illustrated example, the default RouteGroup 1124 is selected for all requests associated with any partner excluding Partner A. A SW Route 1126, a RouteOffer P7 1128 and a RouteOffer P21 1130 are selected for all non Partner A data associated with a SW Market data partition. As shown in FIG. 11, the RouteOffer P7 1128 is associated with endpoints in a city3 1132A, 1132B and has a sequence value of 1 and the RouteOffer P21 1130 is associated with endpoints in a city4 1134A, 1134B and has a sequence value of 2. As a result, all non Partner A request messages associated with the SW market are delivered to an endpoint in the city3 1132A 1132B and, in the event that all delivery attempts to the endpoints in the city3 1132A, 1132B fail, delivery is attempted to the endpoints in the city4 1134A, 1134B. A NW Route 1136, a RouteOffer P5 1138 and a RouteOffer P8 1140 are selected for all non Partner A data associated with a NW data partition. The RouteOffer P5 1138 is associated with endpoints in city5 1142A, 1142B and has a sequence value of 1. The RouteOffer P8 1140 is associated with endpoints in a city6 1144A, 1144B and has a sequence value of 2. As a result, in the illustrated example, all non Partner A request messages associated with the NW market are delivered to endpoints in city5 1142A, 1142B and, in the event that all delivery attempts to the endpoints in city5 1142A, 1142B fail, delivery is attempted to one of the endpoints 1144A, 1144B in the city6.

Figure 12:
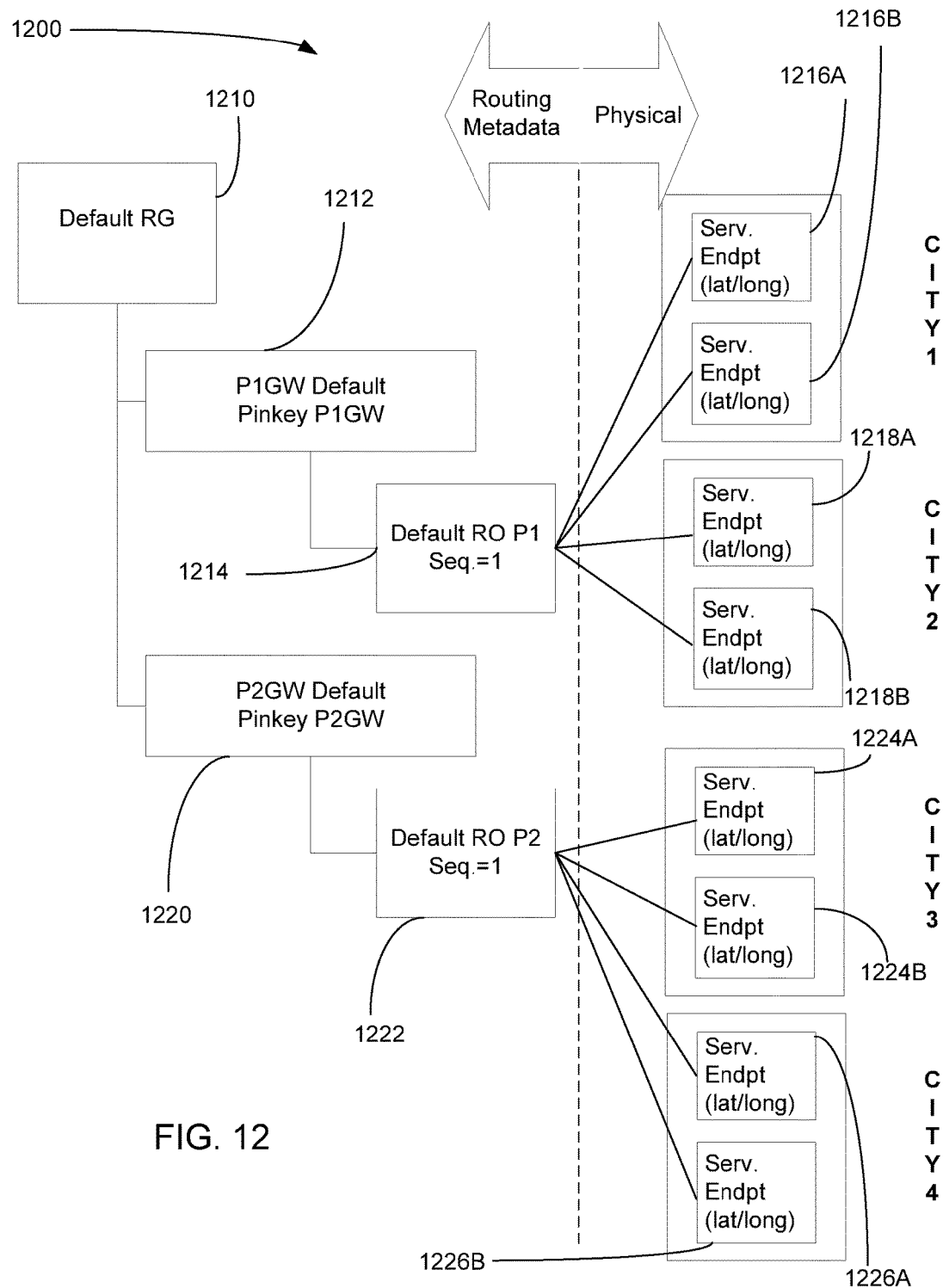
FIG. 12 is a diagram of an example affinity rule that can be used to achieve pinned routes.

Referring to FIG. 12, in some examples, an example affinity rule is configured to provide selection of an endpoint based on one or more pinned routes. In this example, partner isolation is not provided so that a default RouteGroup 1210 is selected for all request messages. A Route P1GW 1212 and a Default RouteOffer P1 1214 are selected for all request messages associated with a first pin key called P1GW. The Default RouteOffer P1 1214 is associated with endpoints in a city1 1216A, 1216B and in a city2 1218A, 1218B. As a result, all request messages associated with the pin key P1GW are delivered to one of the endpoints in the city1 1216A, 1216B or one of the endpoints in the city2 1218A, 1218B. A Route P2GW 1220, and a Default RouteOffer P2 1222 are selected for all request messages associated with a second pin key called P2GW. The Default RouteOffer P2 1222 is associated with endpoints in a city3 1224A, 1224B and with endpoints in a city4 1226A, 1226B. As a result, all request messages associated with the pin key P2GW are delivered to an endpoint in the city3 1224A, 1224B or an endpoint in the city4. Using the pinned route P1GW or P2GW, the client is permitted to override the affinity rule 205 that is otherwise associated with a business service.

While example manners of implementing the example system of FIG. 1 have been illustrated in FIG. 2-FIG. 12 one or more of the elements, processes and/or devices illustrated in the FIG. 1-FIG. 12 can be combined, divided, re-arranged, omitted, eliminated and/or implemented in any other way. Further, any of the example affinity rules application processor 218, the example business service controller 202, the example business service endpoint configuration tool 204, the example affinity rule creators 207, 212, the example affinity rule publisher 208, the example communication tool 209, the example affinity rule storage/retrieval tool 215, the example location tool 213, the example data request processor 214, the example request message communicator 220, the example service endpoints A, B, C, D, the example affinity rule requestor/receiver 210 and/or, more generally, the example client service processor 108, the example business service processor 110 and the example affinity rule processor 102 may be implemented by hardware, software, firmware and/or any combination of hardware, software and/or firmware. Thus, for example, any of the example affinity rules application processor 218, the example business service controller 202, the example business service endpoint configuration tool 204, the example affinity rule creators 207, 212, the example affinity rule publisher 208, the example communication tool 209, the example affinity rule storage/retrieval tool 215, the example location tool 213, the example data request processor 214, the example request message communicator 220, example affinity rule requestor/receiver 210 and the example service endpoints A, B, C, D and/or, more generally, the example client service processor 108, business service processor 110 and the affinity rule processor 102 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims of this patent are read to cover a purely software and/or firmware implementation at least one of the example affinity rules application processor 218, the example business service controller 202, the example business service endpoint configuration tool 204, the example affinity rule creators 207, 212, the example affinity rule publisher 208, the example communication tool 209, the example affinity rule storage/retrieval tool 215, the example location tool 213, the example data request processor 214, the example request message communicator 220, the example service endpoints A, B, C, D, the example affinity rule requestor/receiver 210 and/or, more generally, the example client service processor 108, the example business service processor 110 and the example affinity rule processor 102 are hereby expressly defined to include a tangible computer readable medium such as a memory, digital versatile disk (DVD), compact disk (CD), etc., storing such software and/or firmware. Further still, the example system of FIG. 1 may include one or more elements, processes and/or devices in addition to, or instead of, those illustrated in FIGS. 2-12, and/or may include more than one of any or all of the illustrated elements, processes and devices.

Flowcharts representative of example machine readable instructions that may be executed to implement the example message routing systems of FIGS. 1-12 are shown in FIGS. 13-16. In these examples, the machine readable instructions represented by each flowchart may comprise one or more programs for execution by a processor, such as the processor 1712 shown in the example processing system 1700 discussed below in connection with FIG. 17. Alternatively, the entire program or programs and/or portions thereof implementing one or more of the processes represented by the flowcharts of FIGS. 13-16 could be executed by a device other than the processor 1712 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowcharts of FIGS. 13-16 can be implemented manually. Further, although the example machine readable instructions are described with reference to the flowcharts illustrated in FIGS. 13-16, many other techniques for implementing the example methods and apparatus described herein may alternatively be used. For example, with reference to the flowcharts illustrated in FIGS. 13-16, the order of execution of the blocks may be changed, and/or some of the blocks described may be changed, eliminated, combined and/or subdivided into multiple blocks.

As mentioned above, the example processes of FIGS. 13-16 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 13-16 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 13:
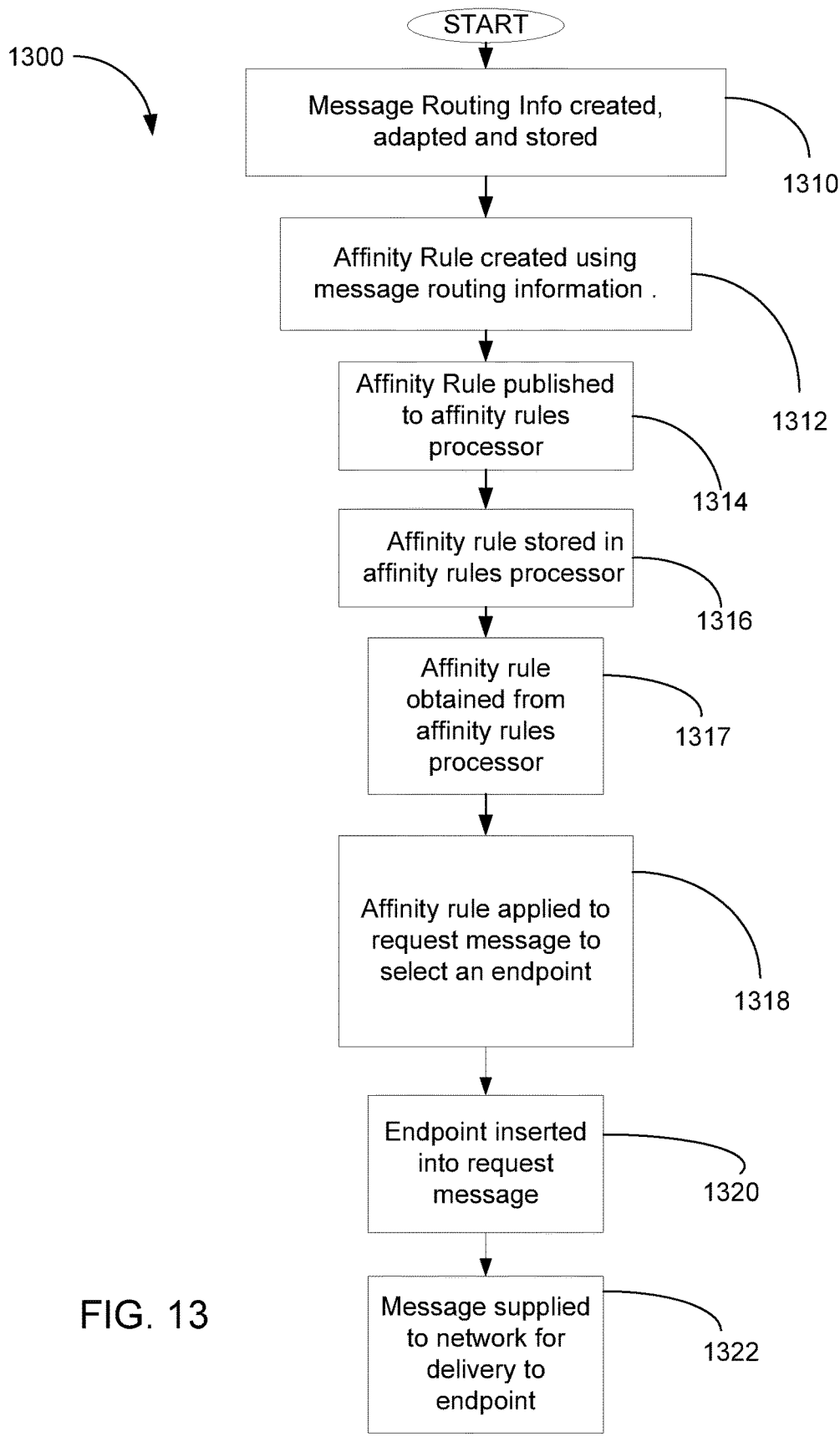
FIG. 13 is a flowchart representative of example computer readable instructions that can be executed by the example system of FIGS. 1, 2 and 3 to develop and distribute an affinity rule among the system elements.

Example machine readable instructions 1300 that may be executed to implement the elements of FIGS. 1-12 are represented by the flowchart shown in FIG. 13. The example machine readable instructions 1300 may be executed periodically and/or aperiodically (e.g., at predetermined intervals, based on an occurrence of a predetermined event, etc., or any combination thereof). The machine readable instructions 1300 begin execution at block 1310 of FIG. 13 at which the message routing information is created by the business service controller 202 and then adapted for storage in the memory 206. The affinity rule creator 207 then uses the stored information to create an affinity rule at a block 1312 for publication to the affinity rules processor 102 at a block 1314. The affinity rules processor 102 stores the affinity rule 205 at a block 1316 and the location tool 213 associates each of the key values identified by the affinity rule 205 with a corresponding set of IP addresses for the endpoints. The client affinity rule requestor/receiver 210 retrieves the affinity rule 205 from the affinity rule processor 102 and then stores the information in the memory 217 at a block 1317. The affinity rule application processor 218 applies the affinity rule 205 to a request message to select an endpoint at a block 1318. At the request message communicator 220, information identifying the selected endpoint is inserted into the request message at a block 1320 and transmitted to the selected endpoint(s) via the network 111 at a block 1322. In another example, information identifying the selected endpoint is inserted into the request message by the affinity rule application processor 218.

Figure 14:
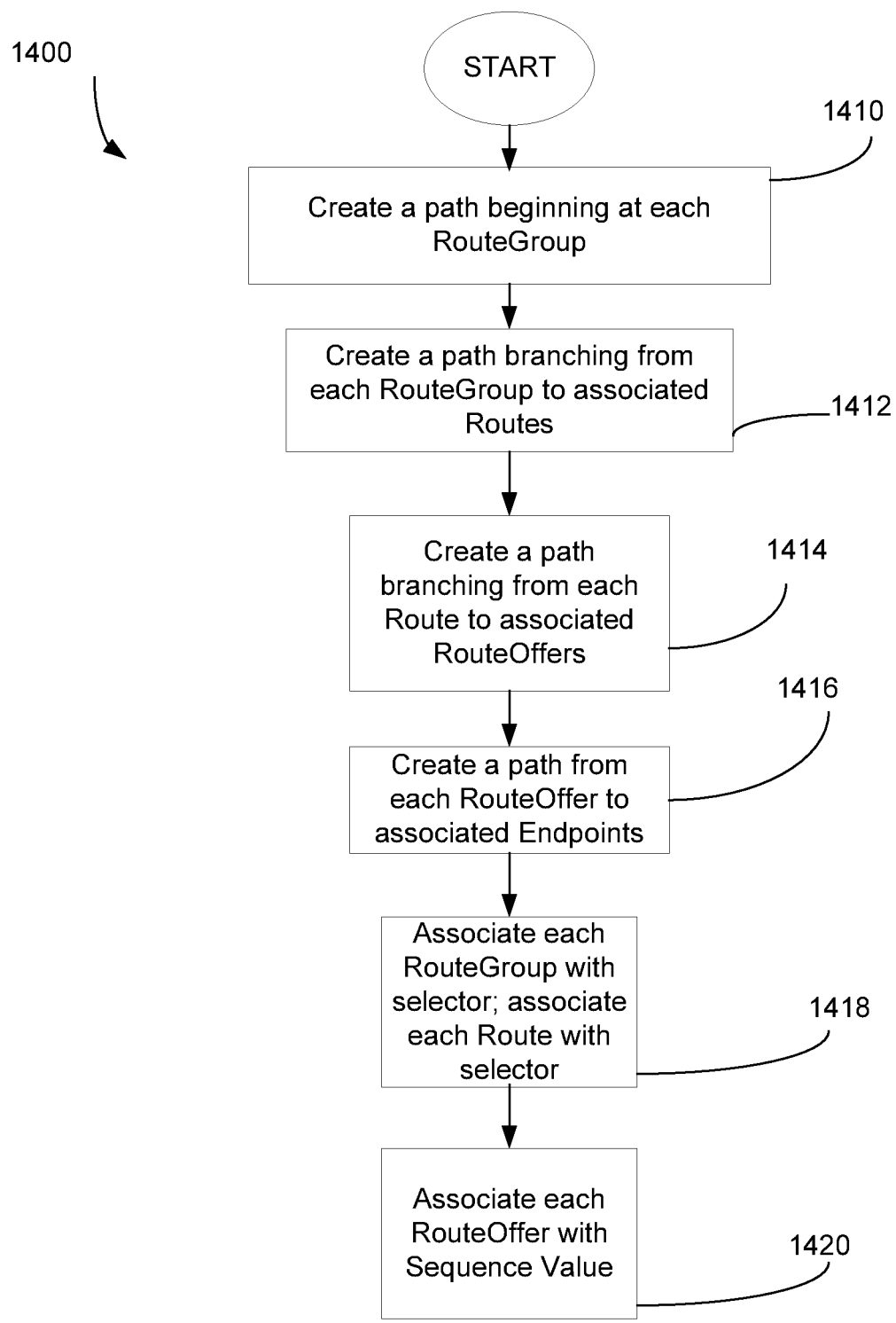
FIG. 14 is a flowchart representative of example computer readable instructions that can be executed by the example business processor of FIGS. 1 and 2 to develop an affinity rule.

Example machine readable instructions 1400 that may be executed to implement the affinity rule creators 207, 212 of FIG. 2 are represented by the flowchart shown in FIG. 14. The example machine readable instructions 1400 may be executed at predetermined intervals, based on an occurrence of a predetermined event, etc., or any combination thereof. The machine readable instructions 1400 begin execution at block 1410 of FIG. 14 at which the affinity rule creators 207, 212 create a set of one or more paths each beginning at a separate one of the RouteGroups. At a block 1412, the affinity rule creators 207, 212 create a path that branches out from each RouteGroup to each of its associated Routes as specified by the Route Information Path Table 310. At a block 1414, the affinity rule creators 207, 212 create a path that branches out from each Route to each of its associated RouteOffers as specified by the Route Information Path Table 310. At a block 1416, the affinity rule creators 207, 212 create a path that branches out from each RouteOffer to each of its associated service endpoints represented by a set of key values in the Route Information Path Table 310. At a block 1418, the affinity rule creators 207, 212 associate each Route Group and each Route with its corresponding selector as specified by the Route Selector Table 312 so that each request message can be routed by applying the appropriate selectors to the request message until an appropriate endpoint is selected. At a block 1420, each key value is associated with a set of endpoints and a sequence value is associated with each of the RouteOffers.

Figure 15:
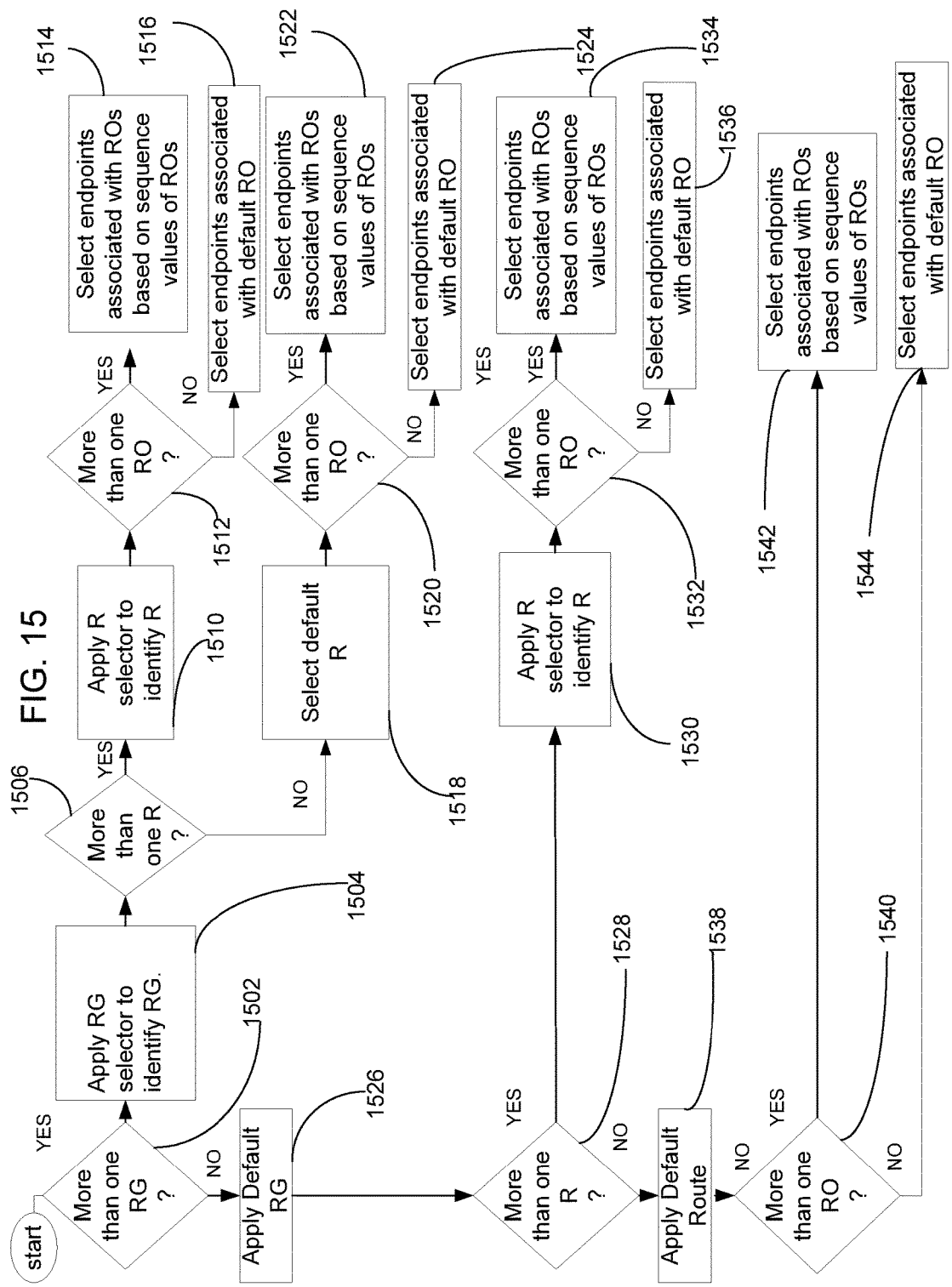
FIG. 15 is a flowchart representative of example computer readable instructions that can be executed by the example affinity rule application processor of FIG. 2 to apply an affinity rule.

Example machine readable instructions 1500 that may be executed to implement the affinity rule application processor 218 of FIG. 2 are represented by the flowchart shown in FIG. 15. The example machine readable instructions 1500 may be executed at predetermined intervals, based on an occurrence of a predetermined event, etc., or any combination thereof. The machine readable instructions 1500 begin execution at block 1502 of FIG. 15 at which the affinity rule application processor 218 determines whether more than one RouteGroup is identified by the affinity rule. If more than one RouteGroup is identified, the request message information is evaluated against the selector associated with each of the Route Groups and the Route Group having a selector that is satisfied by the partner data associated with the request message is selected at a block 1504. At a block 1506, the affinity rule application processor 218 determines whether more than one Route is identified by the affinity rule 205 as being associated with the selected RouteGroup. If more than one Route is identified for the selected Route Group, the request message information is evaluated against the selector associated with each of the associated Routes. The Route having a selector that is satisfied by the data associated with the request message is selected at a block 1510. At a block 1512, the affinity rules application processor 218 determines whether more than one RouteOffer is identified by the affinity rule 205 as being associated with the selected Route. At a block 1514, if more than one RouteOffer is identified for the selected Route, a sequence associated with each RouteOffer is used to determine the order in which message delivery will be attempted among the endpoints associated with the RouteOffers. At the block 1514, if all of the RouteOffers have the same sequence value then request message delivery among the RouteOffers will not occur in any particular order. If at the block 1512, the affinity rules application processor 218 determines that one RouteOffer is associated with the selected Route, the endpoints associated with the default RouteOffer are selected for all request messages at a block 1516.

If at the block 1506, the affinity rules application processor determines that one Route is associated with the selected RouteGroup, the default Route is selected for all request messages at a block 1518. At a block 1520, the affinity rules application processor 218 determines whether more than one RouteOffer is identified by the affinity rule 205 as being associated with the default Route. If more than one RouteOffer is identified for the default Route, a sequence associated with each RouteOffer is used to determine the order in which message delivery will be attempted among the RouteOffers at a block 1522. If all of the RouteOffers associated with the default Route have the same sequence value then message delivery among the RouteOffers will not occur in any particular order. If at the block 1520, the affinity rules application processor 218 determines that one RouteOffer is associated with the default Route, the endpoints associated with the default RouteOffer are selected for all request messages at a block 1524.

If at the block 1502, the affinity rules application processor 218 determines that one RouteGroup is identified by the affinity rule, the default RouteGroup is selected for all request messages at a block 1526. At a block 1528, the affinity rule application processor 218 determines whether more than one Route is identified by the affinity rule 205 as being associated with the default RouteGroup. If more than one Route is identified for the default Rout Group, the request message information is evaluated against the selector associated with each of the associated Routes. The Route having a selector that is satisfied by the data associated with the request message is selected at a block 1530. At a block 1532, the affinity rules application processor 218 determines whether more than one RouteOffer is identified by the affinity rule 205 as being associated with the selected Route. If more than one RouteOffer is identified for the selected Route, a sequence associated with each RouteOffer is used to determine the order in which message delivery will be attempted among the endpoints associated with the RouteOffers at a block 1534. If all of the RouteOffers have the same sequence value then message delivery among the RouteOffers will not occur in any particular order. If at the block 1532, the affinity rules application processor determines that one RouteOffer is associated with the selected Route, the endpoints associated with the default RouteOffer are selected for all request messages at a block 1536.

If, at the block 1528, one Route is associated with the selected RouteGroup, then a Default Route is selected at block 1538. At a block 1540, the affinity rules application processor 218 determines whether more than one RouteOffer is associated with the default Route. If more than one RouteOffer is identified for the default Route, a sequence associated with each RouteOffer is used to determine the order in which message delivery will be attempted among the endpoints associated with the RouteOffers at a block 1542. If all of the RouteOffers have the same sequence value then message delivery among the RouteOffers will not occur in any particular order. If at the block 1540, the affinity rules application processor 218 determines that one RouteOffer is associated with the selected Route, the endpoints associated with the default RouteOffer are selected for all request messages at a block 1544.

Figure 16:
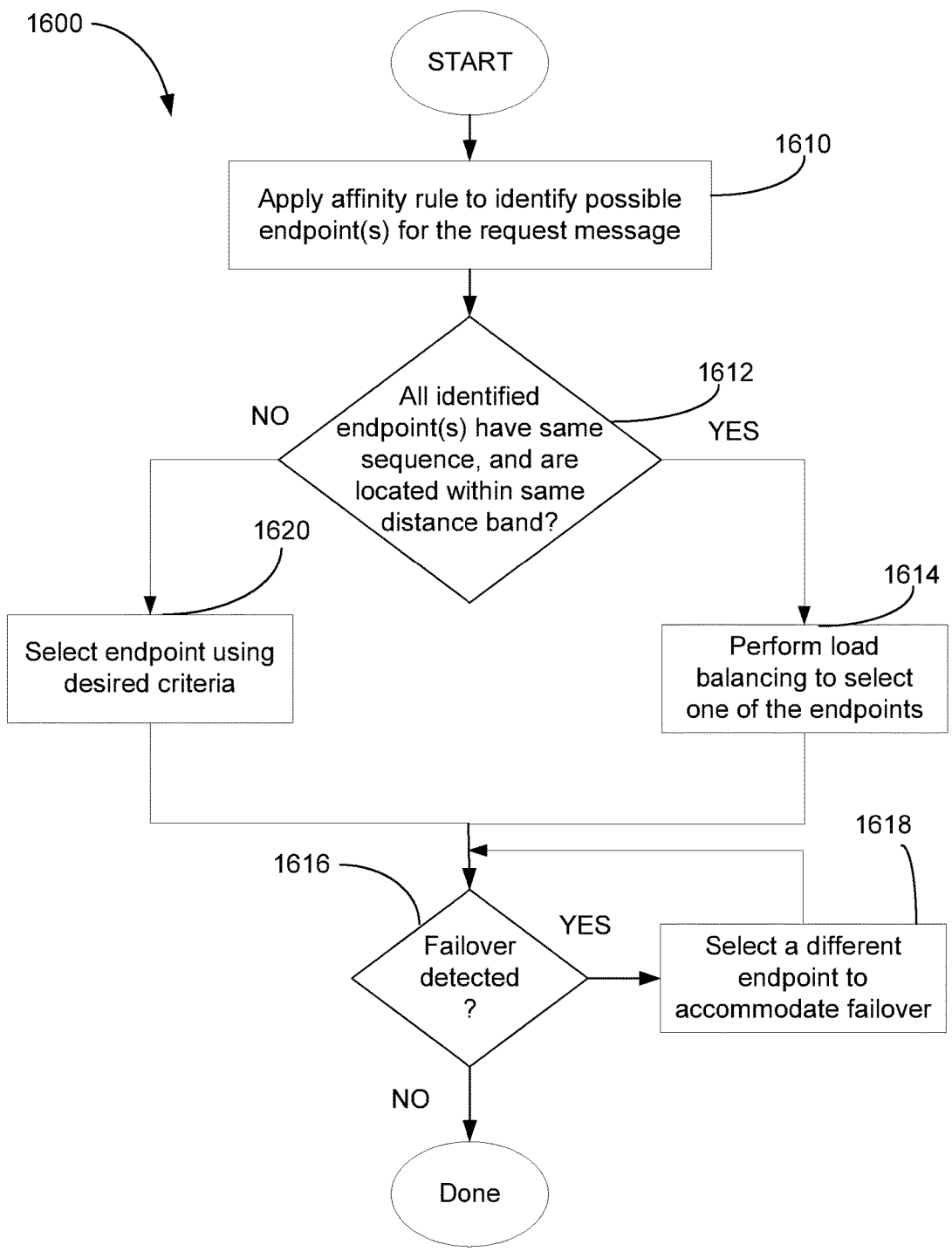
FIG. 16 is a flowchart representative of example computer readable instructions that can be executed by the example affinity rule application processor of FIG. 2 to achieve load balancing and accommodate failover.

Example machine readable instructions 1600 that may be executed to implement the affinity rule application processor 218 FIG. 2 are represented by the flowchart shown in FIG. 16. The example machine readable instructions 1600 may be executed at predetermined intervals, based on an occurrence of a predetermined event, etc., or any combination thereof. The machine readable instructions 1600 begin execution at block 1610 of FIG. 16 at which the affinity rule application processor 218 obtains a request message and applies the affinity rule 205 to identify possible endpoint(s) for the request message. At a block 1612, the affinity rule application processor 218 determines whether all of the identified endpoint(s) are associated with RouteOffers having the same sequence and whether all of the endpoint(s) are located within the same distance band. If both conditions are met, at a block 1614, the rules application processor 218 uses load balancing to select from among the identified endpoints. In some examples, this is achieved by selecting the identified endpoints on an alternating basis such that a first endpoint is selected for a first message, a second endpoint is selected for the next message and a third endpoint is selected for a third message, as described above. At a block 1616, the affinity rule application processor 218 determines whether a failover condition has been detected at the first selected endpoint for the given request message. If a failover condition is detected, the affinity rule application processor 218 selects a second of the identified endpoint(s)

If the affinity rule application processor 218 determines at the block 1612 both conditions are not met, the endpoint(s) is selected based on another criteria such as the sequence of the RouteOffer associated with the endpoint(s) and/or the geographic locations of the endpoint(s) at a block 1620. If the affinity rule application processor 218 determines at the block 1616 that failover has not been detected, the request message has been successfully delivered.

Figure 17:
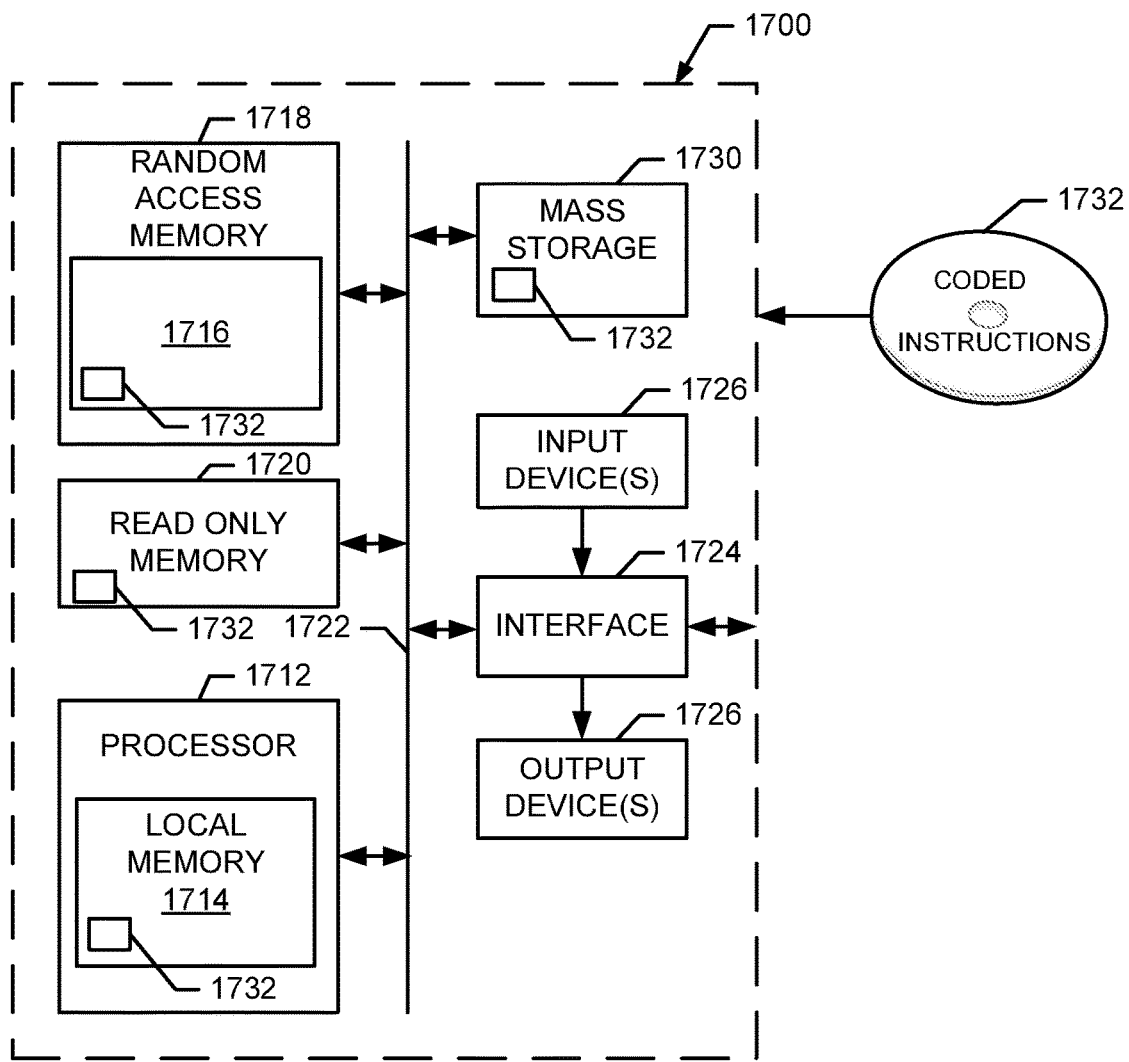
FIG. 17 is a block diagram of an example processing system that may execute example machine readable instructions of FIGS. 13, 14, 15 and/or 16 to implement the example systems of FIGS. 1 and/or 2.

FIG. 17 is a block diagram of an example processing system 1700 capable of implementing the apparatus and methods disclosed herein. The processing system 1700 may be, for example, a server, a personal computer, a personal digital assistant (PDA), an Internet appliance, a DVD player, a CD player, a digital video recorder, a personal video recorder, a set top box, or any other type of computing device.

The system 1700 of the instant example includes a processor 1712 such as a general purpose programmable processor. The processor 1712 includes a local memory 1714, and executes coded instructions 1716 present in the local memory 1714 and/or in another memory device. The processor 1712 may execute, among other things, some or all of the machine readable instructions represented in FIGS. 13-17 to implement one or more of the example systems of FIGS. 1-12. For example, the processor 1712 may be implemented by one or more microprocessors or controllers from any desired family or manufacturer.

The processor 1712 is in communication with a main memory including a volatile memory 1718 and a non-volatile memory 1720 via a bus 1722. The volatile memory 1518 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1720 may be implemented by flash memory and/or any other desired type of memory device. Access to the main memory 1718, 1720 is controlled by a memory controller (not shown).

The processing system 1700 also includes an interface circuit 1724. The interface circuit 1724 may be implemented by any type of interface standard, such as an Ethernet interface, a universal serial bus (USB), and/or a third generation input/output (3GIO) interface.

One or more input devices 1726 are connected to the interface circuit 1724. The input device(s) 1726 permit a user to enter data and commands into the processor 1712. The input device(s) may be implemented by, for example, a keyboard, a mouse, a touchscreen, a track-pad, a trackball, an isopoint and/or a voice recognition system.

One or more output devices 1728 are also connected to the interface circuit 1724. The output devices 1728 may be implemented, for example, by display devices (e.g., a liquid crystal display, a cathode ray tube display (CRT)), by a printer and/or by speakers. The interface circuit 1824, thus, typically includes a graphics driver card.

The interface circuit 1724 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1700 also includes one or more mass storage devices 1730 for storing machine readable instructions and data. Examples of such mass storage devices 1730 include floppy disk drives, hard drive disks, compact disk drives and digital versatile disk (DVD) drives.

The coded instructions 1732 of FIGS. 13-16 may be stored in the mass storage device 1730, in the volatile memory 1718, in the non-volatile memory 1720, in the local memory 1714 and/or on a removable storage medium, such as a CD or DVD 1732.

At least some of the above described example methods and/or apparatus are implemented by one or more software and/or firmware programs running on a computer processor. However, dedicated hardware implementations including, but not limited to, application specific integrated circuits, programmable logic arrays and other hardware devices may likewise be constructed to implement some or all of the example methods and/or apparatus described herein, either in whole or in part. Furthermore, alternative software implementations including, but not limited to, distributed processing or component/object distributed processing, parallel processing, or virtual machine processing may also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method for selecting a destination endpoint, the method comprising:
   receiving, at a client service processor, a request from a client device for first information;
   accessing, at the client service processor, a rule specifying a first set of destination endpoints and a partitioning strategy used to store a set of information including the first information at the first set of destination endpoints, the set of information stored at the first set of destination endpoints being partitioned according to the partitioning strategy specified by the rule, and the partitioning strategy being based on a set of numerical ranges and further being based on respective geographic locations of the first set of destination endpoints;
   applying, with the client service processor, the rule to the request to select a first destination endpoint of the first set of destination endpoints to process the request, the selection being based on the partitioning strategy, a first characteristic of the first information being requested, and a second characteristic of the request,
   the first characteristic being a number falling within one of the set of numerical ranges, and the second characteristic being a geographic location of the client service processor;
      wherein the first set of destination endpoints includes a second set of destination endpoints geographically co-located within a predefined radius, the second set of destination endpoints includes the first destination endpoint, and the selection is further based on a physical distance between the second set of destination endpoints and the client service processor;
      transmitting the request from the client service processor to the first destination endpoint thus selected;
      receiving, at the client service processor, the first information from the first destination endpoint, the first information being responsive to the request; and
      forwarding, from the client service processor, the first information to the client device.

2. The method of claim 1, wherein the client service processor is a first processor, the rule is a first rule, and accessing the first rule includes receiving the rule from a second processor, the second processor storing a plurality of rules including the first rule, respective ones of the plurality of rules being associated with a corresponding one of a plurality of third processors.

3. The method of claim 2, wherein the request is an information request and accessing the first rule further includes:
   periodically generating a rule request, at the first processor, for an updated version of the first rule; and
   transmitting the rule request to the second processor.

4. The method of claim 2, wherein the first processor retrieves the first rule from the second processor in response to receiving the request from the client device.

5. The method of claim 1, wherein the number associated with the first characteristic falls within a first numerical range of the set of numerical ranges and the first destination endpoint stores a subset of the set of information, the subset of the set of information being associated with the first numerical range.

6. A tangible computer readable medium including computer readable instructions which, when executed, cause a processor to perform operations comprising:
   receiving a request from a client device for first information;
   accessing a rule specifying a first set of destination endpoints and a partitioning strategy used to store a set of information including the first information at the first set of destination endpoints, the set of information stored at the first set of destination endpoints being partitioned according to the partitioning strategy specified by the rule, and the partitioning strategy being based on a set of numerical ranges, and further being based on respective geographic locations of the first set of destination endpoints;
   applying the rule to the request to select a first destination endpoint of the first set of destination endpoints to process the request, the selection being based on the partitioning strategy, a first characteristic of the first information being requested, and a second characteristic of the request, the first characteristic of the first information being a number falling within one of the set of numerical ranges, and the second characteristic of the request being a geographic location of the processor;
   wherein the first set of destination endpoints includes a second set of destination endpoints geographically co-located within a predefined radius, the second set of destination endpoints includes the first destination endpoint, and the selection is further based on a physical distance between the second set of destination endpoints and the processor;
   transmitting the request to the first destination endpoint thus selected;
   receiving the first information from the first destination endpoint, the first information being responsive to the request; and
   forwarding the first information to the client device.

7. The tangible computer readable medium of claim 6, wherein the processor is a first processor, the rule is a first rule, and accessing the first rule includes receiving the first rule from a second processor, the second processor storing a plurality of rules including the first rule, respective ones of the plurality of rules being associated with corresponding ones of a plurality of third processors.

8. The tangible computer readable medium of claim 7, wherein the request is an information request and accessing the first rule further includes:
   periodically generating a rule request for an updated version of the first rule; and
   transmitting the rule request to the second processor.

9. The tangible computer readable medium of claim 7, wherein first rule is retrieved from the second processor in response to receiving the request from the client device.

10. The tangible computer readable medium of claim 6, wherein the number falls within a first numerical range of the set of numerical ranges and the first destination endpoint stores a subset of the set of information, the subset of the set of information being associated with the first numerical range.

11. An apparatus comprising:
memory including computer readable instructions; and
a processor to execute the instructions to perform operations including:
receiving a request from a client device for first information;
accessing a rule specifying a first set of destination endpoints and a partitioning strategy used to store a set of information including the first information at the first set of destination endpoints, the set of information stored at the first set of destination endpoints being partitioned according to the partitioning strategy specified by the rule, and the partitioning strategy being based on a set of numerical ranges, and further being based on respective geographical locations of the first set of destination endpoints:
applying the rule to a request to select a first destination endpoint of the first set of destination endpoints to process the request, the selection being based on the partitioning strategy, a first characteristic of the first information being requested, and a second characteristic of the request, the first characteristic being a number falling within one of the set of numerical ranges and the second characteristic being a geographic location of the processor;
wherein the first set of destination endpoints includes a second set of destination endpoints geographically co-located within a predefined radius, the second set of destination endpoints includes the first destination endpoint, and the selection is further based on a physical distance between the second set of destination endpoints and the processor;
transmitting the request to the first destination endpoint thus selected;
receiving the first information from the first destination endpoint, the first information being responsive to the request; and
forwarding the first information to the client device.

12. The apparatus of claim 11, wherein the processor is a first processor, the rule is a first rule, and accessing the first rule includes receiving the rule from a second processor, the second processor storing a plurality of rules including the first rule, respective ones of the plurality of rules being associated with corresponding ones of a plurality of third processors.

13. The apparatus of claim 12, wherein the request is an information request and accessing the first rule further includes:
periodically generating a rule request for an updated version of the first rule; and
transmitting the rule request to the second processor.

14. The apparatus of claim 12, wherein the first processor retrieves the first rule from the second processor in response to receiving the request from the client device.

15. The apparatus of claim 11, wherein the number falls within a first numerical range of the set of numerical ranges and the first destination endpoint stores a subset of the set of information, the subset of the set of information being associated with the first numerical range.

* * * * *